(12) United States Patent
Nahum et al.

(10) Patent No.: US 10,913,156 B2
(45) Date of Patent: Feb. 9, 2021

(54) ROBOT SYSTEM WITH END TOOL METROLOGY POSITION COORDINATES DETERMINATION SYSTEM

(71) Applicant: Mitutoyo Corporation, Kanagawa-ken (JP)

(72) Inventors: Michael Nahum, Seattle, WA (US); Casey Edward Emtman, Kirkland, WA (US)

(73) Assignee: Mitutoyo Corporation, Kanagawa (JP)

( * ) Notice: Subject to any disclaimer, the term of this patent is extended or adjusted under 35 U.S.C. 154(b) by 345 days.

(21) Appl. No.: 16/139,902

(22) Filed: Sep. 24, 2018

(65) Prior Publication Data

US 2020/0094407 A1 Mar. 26, 2020

(51) Int. Cl.
*B25J 9/16* (2006.01)
*G05B 19/401* (2006.01)
*G05B 19/402* (2006.01)

(52) U.S. Cl.
CPC ........... *B25J 9/1664* (2013.01); *B25J 9/1697* (2013.01); *G05B 19/401* (2013.01); *G05B 19/402* (2013.01)

(58) Field of Classification Search
USPC ........................................................ 700/245
See application file for complete search history.

(56) References Cited

U.S. PATENT DOCUMENTS

| | | |
|---|---|---|
| 4,613,943 A | 9/1986 | Miyake et al. |
| 4,725,965 A | 2/1988 | Keenan |
| 5,105,368 A | 4/1992 | Alexandersen et al. |
| 5,297,238 A | 3/1994 | Wang et al. |
| 5,617,335 A | 4/1997 | Hashima et al. |
| 5,798,947 A | 8/1998 | Ye et al. |
| 5,876,325 A | 3/1999 | Mizuno et al. |
| 6,222,940 B1 | 4/2001 | Wenzel et al. |
| 6,640,008 B1 | 10/2003 | Lee et al. |
| 6,681,151 B1 | 1/2004 | Weinzimmer et al. |
| 6,781,694 B2 | 8/2004 | Nahum et al. |

(Continued)

OTHER PUBLICATIONS

Krajnik et al., "External Localization System for Mobile Robotics," *16th International Conference on Advanced Robotics (ICAR)*, Nov. 25-29, 2013, Montevideo, Uruguay. (6 Pages).

(Continued)

*Primary Examiner* — Mohammad Ali
*Assistant Examiner* — Joshua T Sanders
(74) *Attorney, Agent, or Firm* — Seed IP Law Group LLP

(57) ABSTRACT

An end tool metrology position coordinates determination system is provided for use with a robot. A first accuracy level defined as a robot accuracy (e.g., for controlling and sensing an end tool position of an end tool that is mounted proximate to a distal end of a movable arm configuration of the robot) is based on using position sensors (e.g., encoders) included in the robot. The system includes the end tool, an imaging configuration, XY scale, image triggering portion and processing portion. One of the XY scale or imaging configuration is coupled to the end tool and the other is coupled to a stationary element (e.g., a frame located above the robot). The imaging configuration acquires an image of the XY scale, which is utilized to determine a relative position that is indicative of the end tool position, with an accuracy level that is better than the robot accuracy.

22 Claims, 9 Drawing Sheets

(56) References Cited

U.S. PATENT DOCUMENTS

| | | | |
|---|---|---|---|
| 6,937,349 B2 * | 8/2005 | Jones | G01D 5/2455 250/231.13 |
| 7,105,753 B1 | 9/2006 | Lapstun et al. | |
| 7,532,949 B2 | 5/2009 | Ban et al. | |
| 7,845,560 B2 | 12/2010 | Emanuel et al. | |
| 8,792,963 B2 | 7/2014 | Zhao et al. | |
| 8,981,324 B2 | 3/2015 | Rigney et al. | |
| 9,050,728 B2 | 6/2015 | Ban et al. | |
| 9,572,549 B2 | 2/2017 | Belevich et al. | |
| 9,797,706 B2 * | 10/2017 | Jordil | G01B 21/047 |
| 10,058,996 B2 | 8/2018 | Hosek et al. | |
| 10,099,380 B2 | 10/2018 | Ishige et al. | |
| 10,625,427 B2 | 4/2020 | Troy et al. | |
| 2003/0144765 A1 | 7/2003 | Habibi et al. | |
| 2005/0225278 A1 | 10/2005 | Ban et al. | |
| 2006/0017022 A1 | 1/2006 | Rigney et al. | |
| 2009/0180667 A1 | 7/2009 | Mahan et al. | |
| 2009/0234502 A1 | 9/2009 | Ueyama et al. | |
| 2010/0331855 A1 | 12/2010 | Zhao et al. | |
| 2011/0029131 A1 | 2/2011 | Ban et al. | |
| 2013/0035791 A1 | 2/2013 | Chiu et al. | |
| 2013/0090554 A1 | 4/2013 | Zvuloni et al. | |
| 2013/0123982 A1 | 5/2013 | Chiu et al. | |
| 2014/0157610 A1 * | 6/2014 | Garvey | G05B 19/401 33/503 |
| 2014/0301632 A1 | 10/2014 | Ikeda et al. | |
| 2015/0158181 A1 | 6/2015 | Kawamura et al. | |
| 2016/0008988 A1 | 1/2016 | Kennedy et al. | |
| 2016/0039096 A1 | 2/2016 | Wallack et al. | |
| 2016/0136812 A1 | 5/2016 | Hosek et al. | |
| 2016/0151915 A1 | 6/2016 | Nishi et al. | |
| 2016/0223316 A1 | 8/2016 | Jordil et al. | |
| 2017/0140521 A1 | 5/2017 | Sakaguchi et al. | |
| 2017/0148154 A1 | 5/2017 | Nakao | |
| 2017/0151671 A1 | 6/2017 | Ishige et al. | |
| 2017/0182665 A1 | 6/2017 | Okuyama et al. | |
| 2018/0004188 A1 | 1/2018 | Yamaguchi et al. | |
| 2018/0018778 A1 | 1/2018 | Haverkamp et al. | |
| 2018/0153437 A1 | 6/2018 | Schwartz et al. | |
| 2018/0272490 A1 | 9/2018 | Brenner et al. | |
| 2018/0279993 A1 | 10/2018 | Crawford et al. | |
| 2018/0361571 A1 | 12/2018 | Georgeson et al. | |
| 2018/0361595 A1 | 12/2018 | Troy et al. | |
| 2019/0005600 A1 | 1/2019 | Hazeyama | |
| 2019/0015980 A1 | 1/2019 | Kojima et al. | |
| 2019/0056218 A1 | 2/2019 | Ulmer et al. | |
| 2019/0099887 A1 * | 4/2019 | Huang | G01B 11/005 |
| 2019/0195607 A1 | 6/2019 | Nahum | |
| 2019/0256300 A1 | 8/2019 | Shimamura et al. | |
| 2019/0291277 A1 | 9/2019 | Oleynik | |

OTHER PUBLICATIONS

Perez et al., "Robot Guidance Using Machine Vision Techniques in Industrial Environments: A Comparative Review," *Sensors* 16(3):335, 2016. (26 pages).

Scara, URL=https://en.wikipedia.org/w/index.php?title=Scara&oldid=838861482, Archive Date Apr. 29, 2018. (2 pages).

* cited by examiner

ROBOT SYSTEM WITH END TOOL METROLOGY POSITION COORDINATES DETERMINATION SYSTEM

BACKGROUND

Technical Field

This disclosure relates to robot systems, and more particularly to systems for determining coordinates of an end tool position of a robot.

Description of the Related Art

Robotic systems are increasingly utilized for manufacturing and other processes. Various types of robots that may be utilized include articulated robots, selective compliance articulated robot arm (SCARA) robots, cartesian robots, cylindrical robots, spherical robots, etc. As one example of components that may be included in a robot, a SCARA robot system may typically have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy of approximately 100 microns, as limited by certain factors (e.g., the rotary encoder performance in combination with the mechanical stability of the robot system, etc.).

U.S. Pat. No. 4,725,965, which is hereby incorporated herein by reference in its entirety, discloses certain calibration techniques for improving the accuracy of a SCARA system. As described in the '965 patent, a technique is provided for calibrating a SCARA type robot comprising a first rotatable arm portion and a second rotatable arm portion which carries an end tool. The calibration technique is in relation to the fact that the SCARA robot may be controlled using a kinematic model, which, when accurate, allows the arm portions to be placed in both a first and second angular configuration at which the end tool carried by the second arm portion remains at the same position. To calibrate the kinematic model, the arm portions are placed in a first configuration to locate the end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated.

As further described in the '965 patent, the calibration technique may include the use of certain cameras. For example, in one implementation, the datum point may be the center of the viewing area of a stationary television camera (i.e., located on the ground below the end tool), and the output signal of the camera may be processed to determine the shift in the position of the end tool from the center of the viewing area of the camera when the links are switched from the first to the second configuration. In another implementation, the second arm portion may carry a camera, and the technique may begin by placing the arm portions in a first angular configuration, at which a second predetermined interior angle is measured between the arm portions, to center the camera carried by the second arm portion directly above a fixed datum point. The arm portions are then placed in a second angular configuration, at which an interior angle, equal to the second predetermined interior angle, is measured between the arm portions, to nominally center the camera again above the datum point. The output signal of the camera is then processed to determine the shift in the position of the datum point, as seen by the camera, upon switching the arm portions from the first to the second angular configuration. The error in the known position of the camera is then determined in accordance with the shift in the position of the datum point as seen by the camera. The steps are then repeated as part of the calibration process until the error approaches zero.

While techniques such as those described in the '965 patent may be utilized for calibrating a robot system, in certain applications it may be less desirable to utilize such techniques (e.g., which may require significant time and/or may not provide a desired level of accuracy for all possible orientations of a robot during certain operations, etc.). A robot system that can provide improvements with regard to such issues (e.g., for increasing the reliability, repeatability, speed, etc., of the position determination during workpiece measurements and other processes) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An end tool metrology position coordinates determination system is provided for use in conjunction with a robot as part of a robot system. The robot (e.g., an articulated robot, a SCARA robot, a cartesian robot, a cylindrical robot, a spherical robot, etc.) includes a movable arm configuration and a motion control system. The movable arm configuration includes an end tool mounting configuration that is located proximate to a distal end of the movable arm configuration. The robot is configured to move the movable arm configuration so as to move at least a portion of an end tool that is mounted to the end tool mounting configuration along at least two dimensions in an end tool working volume. The motion control system is configured to control an end tool position with a level of accuracy defined as a robot accuracy, based at least in part on sensing and controlling the position of the movable arm configuration using at least one position sensor (e.g., a rotary encoder, a linear encoder, etc.) included in the robot.

The end tool metrology position coordinates determination system includes an end tool, a first imaging configuration, an XY scale, an image triggering portion and a metrology position coordinate processing portion. The end tool is configured to mount to the end tool mounting configuration proximate to the distal end of the movable arm configuration. The first imaging configuration includes a first camera and has an optical axis. The XY scale includes a nominally planar substrate and a plurality of respective imageable features distributed on the substrate, wherein the respective imageable features are located at respective known XY scale coordinates on the XY scale. The image triggering portion is configured to input at least one input signal that is related to the end tool position and determine the timing of a first imaging trigger signal based on the at least one input signal and to output the first imaging trigger signal to the first imaging configuration. The first imaging configuration is configured to acquire a digital image of the XY scale at an image acquisition time in response to receiving the first imaging trigger signal. The metrology position coordinate processing portion is configured to input the acquired image and identify at least one respective imageable feature included in the acquired image of the XY scale and the related respective known XY scale coordinate location. In various implementations, the XY scale may be an incremental scale or an absolute scale.

The end tool metrology position coordinates determination system is configured with a movable one of the XY scale or the first imaging configuration coupled to the end tool, and the other configured to be coupled to a stationary element proximate to the robot. The stationary one of the XY scale or the first imaging configuration defines a first reference position. In an operational configuration of the end tool metrology position coordinates determination system, a scale plane is defined to nominally coincide with the planar substrate of the XY scale, and a direction normal to the scale plane is defined as a scale imaging axis direction, and at least one of the XY scale or the first imaging configuration is arranged with the optical axis of the first imaging configuration parallel to the direction of the scale imaging axis direction and with the scale plane located within the range of focus of the first imaging configuration along the scale imaging axis direction.

The end tool metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine a relative position between the movable one of the XY scale or the first imaging configuration and the first reference position with an accuracy level that is better than the robot accuracy, based on determining an image position of the identified at least one respective imageable feature in the acquired image. The determined relative position is indicative of the metrology position coordinates of the end tool position at the image acquisition time, with an accuracy level that is better than the robot accuracy, at least for a vector component of the x and y metrology position coordinates that is at least one of transverse or perpendicular to the scale imaging axis direction. In various implementations, the end tool metrology position coordinates determination system is configured to determine the metrology position coordinates of the end tool position at the image acquisition time, based on the determined relative position and a known coordinate position offset between the end tool position and the movable one of the XY scale or the first imaging configuration.

In various implementations, the robot is configured to move the end tool and the movable one of the XY scale or the first imaging configuration in a plane parallel to the scale plane, while the end tool metrology position coordinates determination system is in the operational configuration. In various implementations, such movement in a plane parallel to the scale plane may be made in two dimensions (e.g., x and y dimensions), such as by a SCARA robot, articulated robot, etc., or alternatively such movement may be primarily made in one dimension (e.g., an x or y dimension), such as by a linear robot, etc. In various implementations, the robot may include at least one respective rotary joint that provides at least one respective rotational degree of freedom for the end tool, and the robot may be configured to translate and rotate the movable one of the XY scale or the first imaging configuration relative to the stationary one of the XY scale or the first imaging configuration, including rotating the end tool corresponding to the at least one respective rotational degree of freedom, to provide the operational configuration.

In various implementations, the XY scale may be coupled to the end tool and the first imaging configuration may be coupled to the stationary element. In various implementations, the stationary element may comprise a frame arranged above at least a portion of an end tool working volume. The first imaging configuration may be fixed to the frame above a portion of the end tool working volume.

In various implementations, the robot system may be operated in either a robot position coordinates mode or an end tool metrology position coordinates mode. The robot position coordinates mode may correspond to an independent and/or standard mode of operation for the robot (e.g., a mode in which the robot is operated independently, such as when an end tool metrology position coordinates determination system is not active or is otherwise not provided). In the robot position coordinates mode, the robot movements and corresponding end tool position are controlled and determined with the level of accuracy defined as the robot accuracy (i.e., utilizing the position sensors included in the robot). Conversely, in the end tool metrology position coordinates mode, a relative position may be determined by the end tool metrology position coordinates determination system that is indicative of the metrology position coordinates of the end tool position at an image acquisition time, with an accuracy level that is better than the robot accuracy (e.g., better than the accuracy of the position sensors included in the robot), at least for a vector component of the x and y metrology position coordinates that is at least one of transverse or perpendicular to the scale imaging axis direction. In various implementations, the determined position information (e.g., the determined relative position, the determined metrology position coordinates of the end tool position and/or other related determined position information) may then be utilized for performing a designated function (e.g., as part of workpiece measurements, positioning control of the robot, etc.).

As an example with respect to positioning control of the robot, during the end tool metrology position coordinates mode, rather than utilizing the position sensors included in the robot for controlling a positioning of the end tool, an output from the end tool metrology position coordinates determination system may be fed back to the motion control system or otherwise utilized to control the positioning of the end tool. In various implementations, a hybrid operation may be implemented, wherein the position sensors included in the robot may be utilized during a first portion of a robot movement timing (e.g., for determining/controlling the positions of the arm portions and corresponding end tool position as part of initial/fast/coarse movement positioning). Then, during a second portion of the robot movement timing, rather than utilizing the position sensors of the robot, an output of the end tool metrology position coordinates determination system (e.g., the determined relative position or related position information) may be fed back to the motion control system or otherwise utilized for controlling the positioning (e.g., for determining/controlling the positions of the arm portions and the corresponding end tool position as part of a more accurate final/slower/fine movement positioning).

DETAILED DESCRIPTION

Figure 1:
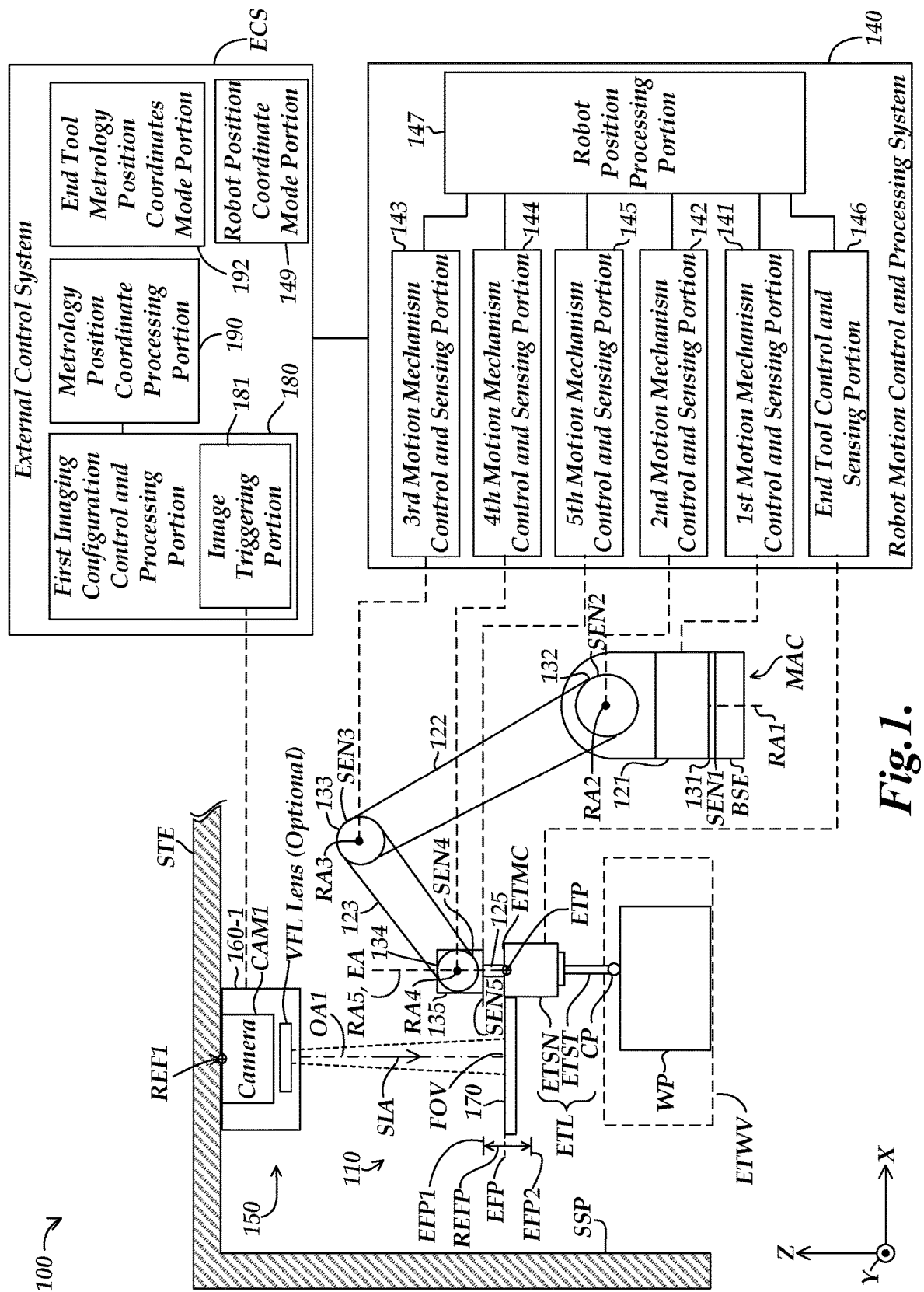
FIG. 1 is a block diagram of a first exemplary implementation of a robot system including an articulated robot and an end tool metrology position coordinates determination system.

FIG. 1 is a block diagram of a first exemplary implementation of a robot system 100 including a robot 110 and an end tool metrology position coordinates determination system 150. The robot 110 (e.g., an articulated robot) includes a movable arm configuration MAC and a robot motion control and processing system 140. The end tool metrology position coordinates determination system 150 includes an end tool ETL, a first imaging configuration 160-1, an XY scale 170, an image triggering portion 181 and a metrology position coordinate processing portion 190. In the configuration of FIG. 1, the XY scale 170 is coupled to the end tool ETL. As will be described in more detail below, the first imaging configuration 160-1 has a first optical axis OA1 that may be parallel to a scale imaging axis direction SIA when in an operational configuration.

In the example of FIG. 1, the movable arm configuration MAC includes a lower base portion BSE, arm portions 121-125, motion mechanisms 131-135, position sensors SEN1-SEN5, and an end tool mounting configuration ETMC. As will be described in more detail below and as further illustrated in FIG. 2, each of the arm portions 121-125 may have respective proximal ends PE1-PE5 and respective distal ends DE1-DE5. In various implementations, some or all of the arm portions 121-125 may be mounted to respective motion mechanisms 131-135 at respective proximal ends PE1-PE5 of the respective arm portions 121-125. In the example of FIG. 1, some or all of the motion mechanisms 131-135 (e.g., rotary joints with corresponding motors) may enable motion (e.g., rotation) of the respective arm portions 121-125 (e.g., about respective rotary axes RA1-RA5). In various implementations, the position sensors SEN1-SEN5 (e.g., rotary encoders) may be utilized for determining the positions (e.g., angular orientations) of the respective arm portions 121-125.

In various implementations, the movable arm configuration MAC may have a portion that is designated as a terminal portion (e.g., the fifth arm portion 125). In the example configuration of FIG. 1, the end tool mounting configuration ETMC is located proximate to (e.g., located at) the distal end DE5 of the fifth arm portion 125 (e.g., designated as the terminal portion), which corresponds to a distal end of the movable arm configuration MAC. In various alternative implementations, a terminal portion of a movable arm configuration may be an element (e.g., a rotatable element, etc.) that is not an arm portion but for which at least part of the terminal portion corresponds to a distal end of the movable arm configuration where the end tool mounting configuration ETMC is located.

In various implementations, the end tool mounting configuration ETMC may include various elements for coupling and maintaining the end tool ETL proximate to the distal end of the movable arm configuration MAC. For example, in various implementations, the end tool mounting configuration ETMC may include an autojoint connection, a magnetic coupling portion and/or other coupling elements as are known in the art for mounting an end tool ETL to a corresponding element. The end tool mounting configuration ETMC may also include electrical connections (e.g., a power connection, one or more signal lines, etc.) for providing power to and/or sending signals to and from at least part of the end tool ETL (e.g., to and from the end tool sensing portion ETSN).

In various implementations, the end tool ETL may include the end tool sensing portion ETSN and an end tool stylus ETST with a contact point CP (e.g., for contacting a surface of a workpiece WP). The fifth motion mechanism 135 is located proximate to the distal end DE4 of the fourth arm portion 124. In various implementations, the fifth motion mechanism 135 (e.g., a rotary joint with a corresponding motor) may be configured to rotate the fifth arm portion 125 about a rotary axis RA5 (e.g., which in some orientations may be parallel to the optical axis OA1 and/or scale imaging axis direction SIA, such as when so oriented by the rotation of the fourth arm portion 124 by the fourth motion mechanism 134 to be in the operational configuration, etc.). In some implementations, the fifth motion mechanism 135 may also or alternatively include a different type of motion mechanism (e.g., a linear actuator) that is configured to move the fifth arm portion 125 linearly (e.g., up and down in the scale imaging axis direction SIA when so oriented in the operational configuration). In any case, the end tool ETL is mounted to (e.g., coupled to) the end tool mounting configuration ETMC, and has a corresponding end tool position ETP with corresponding coordinates (e.g., x, y and z coordinates). In various implementations, the end tool position ETP may correspond to or be proximate to the position of the end tool mounting configuration ETMC (e.g., at or proximate to the distal end DE5 of the fifth arm portion 125, which may correspond to the distal end of the movable arm configuration MAC).

The motion control system 140 is configured to control the end tool position ETP of the end tool ETL with a level of accuracy defined as a robot accuracy. More specifically, the motion control system 140 is generally configured to control the coordinates (e.g., x, y and z coordinates) of the end tool position ETP with the robot accuracy based at least in part on utilizing the motion mechanisms 131-135 and position sensors SEN1-SEN5 for sensing and controlling the positions of the arm portions 121-125. In various implementations, the motion control and processing system 140 may include motion mechanism control and sensing portions 141-145 that may respectively receive signals from the respective position sensors SEN1-SEN5, for sensing the positions (e.g., angular positions, linear positions, etc.) of the respective arm portions 121-125, and/or may provide control signals to the respective motion mechanisms 131-135 (e.g., including motors, linear actuators, etc.) for moving the respective arm portions 121-125.

The motion control and processing system 140 may also receive signals from the end tool sensing portion ETSN. In various implementations, the end tool sensing portion ETSN may include circuitry and/or configurations related to the operations of the end tool ETL for sensing a workpiece WP. As will be described in more detail below, in various implementations the end tool ETL (e.g., a touch probe, a scanning probe, a camera, etc.) may utilized for contacting or otherwise sensing surface locations/positions/points on a workpiece WP, for which various corresponding signals may be received, determined and/or processed by the end tool sensing portion ETSN, which may provide corresponding signals to the motion control and processing system 140. In various implementations, the motion control and processing system 140 may include an end tool control and sensing portion 146 that may provide control signals to and/or receive sensing signals from the end tool sensing portion ETSN. In various implementations, the end tool control and sensing portion 146 and the end tool sensing portion ETSN may be merged and/or indistinguishable. In various implementations, the motion mechanism control and sensing portions 141-145 and the end tool control and sensing portion 146 may all provide outputs to and/or receive control signals from a robot position processing portion 147 which may control and/or determine the overall positioning of the movable arm configuration MAC of the robot 110 and corresponding end tool position ETP as part of the robot motion control and processing system 140.

In various implementations, the end tool metrology position coordinates determination system 150 may be included with or otherwise added to a robot 110 (e.g., as part of a retrofit configuration for being added to an existing robot 110, etc.). In general, the end tool metrology position coordinates determination system 150 may be utilized to provide an improved level of accuracy for the determination of the end tool position ETP. More specifically, as will be described in more detail below, the end tool metrology position coordinates determination system 150 may be utilized to determine a relative position that is indicative of the metrology position coordinates of the end tool position ETP, with an accuracy level that is better than the robot accuracy, at least for a vector component of the x and y metrology position coordinates that is at least one of transverse or perpendicular to the scale imaging axis direction. In various implementations (e.g., where the scale imaging axis direction SIA and the end tool stylus ETST are parallel to the z axis), this may correspond to the accuracy level being better than the robot accuracy, at least for x and y metrology position coordinates in an x-y plane that is perpendicular to the z axis.

As illustrated in FIG. 1, the first imaging configuration 160-1 is coupled to a stationary element STE proximate to the robot 110. In various implementations, the stationary element STE may comprise a frame arranged above at least a portion of an end tool working volume ETWV, and for which the first imaging configuration 160-1 is fixed to the frame above a portion of the end tool working volume ETWV. In various implementations, the stationary element STE may include one or more structural support elements SSP (e.g., extending from a floor, ceiling, etc.) for maintaining the stationary element STE in a fixed location (e.g., with a fixed position and/or orientation) relative to the robot 110.

In various implementations, the end tool working volume ETWV consists of a volume in which at least a portion of at least one of the end tool ETL and/or the XY scale 170 may be moved. In the example of FIG. 1, the end tool working volume ETWV is illustrated as including a volume in which the contact point CP of the end tool ETL may be moved when inspecting a workpiece. As one alternative example, an end tool working volume may alternatively include a volume in which the XY scale 170 may move when the end tool ETL is moved for inspecting a workpiece. In various implementations, the robot 110 is configured to move the movable arm configuration MAC so as to move at least a portion of an end tool ETL (e.g., the contact point CP) that is mounted to the end tool mounting configuration ETMC along at least two dimensions (e.g., x and y dimensions) in the end tool working volume ETWV. In the example of FIG. 1, the portion of the end tool ETL (e.g., the contact point CP) is movable by the robot 110 along three dimensions (e.g., x, y and z dimensions).

The first imaging configuration 160-1 includes a first camera CAM1 and has an optical axis OA1. In an operational configuration of the end tool metrology position coordinates determination system 150, the optical axis OA1 of the first imaging configuration 160-1 is parallel to the direction of the scale imaging axis direction SIA. The first imaging configuration 160-1 has an effective focus range REFP along its optical axis OA1. In various implementations, the range REFP may be bound by first and second effective focus positions EFP1 and EFP2, as will be described in more detail below. At a given time, the first imaging configuration 160-1 has an effective focus position EFP that falls within the range REFP. In an implementation where a variable focal length (VFL) lens is used, the range REFP may correspond to the range of focus of the VFL lens.

In various implementations, a VFL lens that is utilized may be a tunable acoustic gradient index of refraction (TAG) lens. With respect to the general operations of such a TAG lens, in various implementations a lens controller (e.g., as included in a first imaging configuration control and processing portion 180) may rapidly adjust or modulate the optical power of the TAG lens periodically, to achieve a high-speed TAG lens capable of a periodic modulation (i.e., at a TAG lens resonant frequency) of 250 kHz, or 70 kHz, or 30 kHz, or the like. In such a configuration, the effective focus position EFP of the first imaging configuration 160-1 may be (e.g., rapidly) moved within the range REFP (e.g., an autofocus search range). The effective focus position EFP1 (or EFPmax) may correspond to a maximum optical power of the TAG lens, and the effective focus position EFP2 (or EFPmin) may correspond to a maximum negative optical power of the TAG lens. In various implementations, the middle of the range REFP may be designated as EFPnom, and may correspond to zero optical power of the TAG lens.

In various implementations, such a VFL lens (e.g., a TAG lens) and/or a corresponding range REFP may be advantageously chosen such that the configuration limits or eliminates the need for macroscopic mechanical adjustments of the first imaging configuration 160-1 and/or adjustment of distances between components in order to change the effective focus position EFP. For example, in an implementation where an unknown amount of tilt or "sag" at the distal end DE5 of the fifth arm portion 125 (e.g., corresponding to the distal end of the movable arm configuration MAC) may occur (e.g., due to the weight and/or specific orientations of the arm portions 121-125, etc.), the precise focus distance from the first imaging configuration 160-1 to the XY scale 170 may be unknown and/or may vary with different orientations of the arm portions, etc. It will also be appreciated that in the example configuration of FIG. 1, the distance between the XY scale 170 and the first imaging configuration 160-1 may generally change in accordance with the general operations of the movable arm configuration MAC, which may move the end tool position ETP to different locations/distances from the first imaging configuration 160-1 along the scale imaging axis direction SIA (e.g., as part of the operations for scanning a surface of a workpiece WP, etc.). In such configurations, it may be desirable for a VFL lens to be utilized that can scan or otherwise adjust the effective focus position EFP to determine and accurately focus at the XY scale 170. In various implementations, such techniques utilizing a VFL lens may be utilized in combination with other focus adjusting techniques (e.g., utilized in combination with changeable objective lenses that may also be included in the first imaging configuration 160-1, etc.).

In various implementations, the XY scale 170 comprises a nominally planar substrate SUB (e.g., arranged nominally perpendicular to the scale imaging axis direction SIA when in the operational configuration) and a plurality of respective imageable features that are distributed on the substrate SUB. The respective imageable features are located at respective known scale coordinates (e.g., x and y scale coordinates) on the XY scale 170. In various implementations, the XY scale 170 may be an incremental or absolute scale, as will be described in more detail below with respect to FIGS. 5 and 6.

In various implementations, the scale plane is defined to nominally coincide with the planar substrate SUB of the XY scale 170, and a direction normal to the scale plane is defined as the scale imaging axis direction SIA. In the operational configuration of the end tool metrology position coordinates determination system 150, the movable XY scale 170 is arranged so that the direction of the scale imaging axis direction SIA is parallel to the optical axis OA1 of the first imaging configuration 160-1 and the scale plane is located within the range of focus REFP of the first imaging configuration 160-1 along the scale imaging axis direction SIA. It will be appreciated that in order to place the end tool metrology position coordinates determination system 150 at least nominally in the operational configuration with the above noted characteristics, various adjustments may be made to the positions/orientations of the arm portions 121-125 of the movable arm configuration MAC.

As used herein, the term "nominally" encompasses variations of one or more parameters that fall within acceptable tolerances. As an example, in one implementation two elements may be defined herein as being nominally parallel when an angle between the two is less than 5 degrees. In one implementation, the optical axis OA1 of the first imaging configuration 160-1 may be correspondingly defined as being nominally parallel to the direction of the scale imaging axis direction SIA when an angle between the two is less than 5 degrees. In accordance with this definition, the end tool metrology position coordinates determination system 150 may be correspondingly defined as at least nominally being in the operational configuration (e.g., being at least one of in or nominally in the operational configuration) when the components are arranged so that the optical axis OA1 of the first imaging configuration 160-1 is at least one of parallel or nominally parallel to the direction of the scale imaging axis direction SIA, and the scale plane is located within the range of focus of the first imaging configuration 160-1 along the scale imaging axis direction SIA. In various implementations, the end tool metrology position coordinates determination system 150 may be configured such that when the moveable one of the XY scale 170 or the first imaging configuration 160-1 and the stationary one of the XY scale 170 or the first imaging configuration 160-1 are at least nominally arranged in the operational configuration, and the movable arm configuration MAC is positioned with the XY scale 170 in a field of view FOV of the first imaging configuration 160-1, then the metrology position coordinate processing portion 190 is operable to determine a relative position between the movable one of the XY scale 170 or the first imaging configuration 160-1 and the first reference position REF1 with an accuracy level that is better than the robot accuracy.

In various implementations, at least part of a robot 110 (e.g., the movable arm configuration MAC) may include at least one respective rotary joint that provides at least one respective rotational degree of freedom for the end tool ETL, and the robot 110 may be configured to translate and rotate the movable one of the XY scale or the first imaging configuration relative to the stationary one of the XY scale or the first imaging configuration, including rotating the end tool ETL corresponding to the at least one respective rotational degree of freedom, to at least nominally provide the operational configuration. With respect to the example configurations of FIGS. 1 and 2, the at least one respective rotary joint may correspond to at least the fourth motion mechanism 134, and the at least one respective rotational degree of freedom may correspond to at least the rotation around the rotary axis RA4. In accordance with this configuration, the fourth motion mechanism 134 may be operated to rotate the fourth arm portion 124 so as to cause the scale imaging axis direction SIA to be at least one of parallel or nominally parallel to the optical axis OA1 (e.g., to at least nominally be in the operational configuration).

In certain implementations, such adjustments may be made automatically (e.g., a circuit, routine, etc., may be utilized to continually monitor the orientation of the fourth arm portion 124, such as by using the position sensor SEN4 or other sensor, and to utilize the fourth motion mechanism 134 to continually adjust the orientation to cause the XY scale 170 and scale plane to be level/parallel to an x-y plane or otherwise have the scale imaging axis direction SIA be parallel to the optical axis OA1). In various implementations, such operations may be continually performed to maintain the end tool metrology position coordinates determination system 150 at least nominally in the operational configuration.

In various implementations, a robot 110 may also be configured to move the end tool ETL and the movable one of the XY scale or the first imaging configuration in a plane parallel to the scale plane, while the end tool metrology position coordinates determination system 150 is at least nominally in the operational configuration. In various implementations, such movement in a plane parallel to the scale plane may be made in two dimensions (e.g., x and y dimensions), such as by a SCARA robot, an articulated robot, etc., or such movement may be primarily made in one dimension (e.g., an x or y dimension), such as by a linear robot, etc. In the example configurations of FIGS. 1 and 2, the articulated robot 110 may perform such movement in a plane parallel to the scale plane, for example, by utilizing the first motion mechanism 131 to rotate the first arm portion 121 about the rotary axis RA1, thus producing movement (e.g., at the distal end of the movable arm configuration MAC) of the end tool ETL and attached XY scale 170 in two dimensions (e.g., x and y dimensions) in a plane parallel to the scale plane (e.g., which may allow the end tool metrology position coordinates determination system 150 to at least nominally remain in the operational configuration during such movements).

In various implementations, the image triggering portion 181 and/or the metrology position coordinate processing portion 190 may be included as part of an external control system ECS (e.g., as part of an external computer, etc.). The image triggering portion 181 may be included as part of the first imaging configuration control and processing portion 180. In various implementations, the image triggering portion 181 is configured to input at least one input signal that is related to the end tool position ETP and to determine the timing of a first imaging trigger signal based on the at least one input signal, and to output the first imaging trigger signal to the first imaging configuration 160-1. In various implementations, the first imaging configuration 160-1 is configured to acquire a digital image of the XY scale 170 at an image acquisition time in response to receiving the first imaging trigger signal. In various implementations, the metrology position coordinate processing portion 190 is configured to input the acquired image and to identify at least one respective imageable feature included in the acquired image of the XY scale 170 and the related respective known XY scale coordinate location. In various implementations, the external control system ECS may also include a standard robot position coordinates mode portion 149 and an end tool metrology position coordinates mode portion 192, for implementing corresponding modes, as will be described in more detail below.

In various implementations, the first imaging configuration 160-1 may include a component (e.g., a subcircuit, routine, etc.) that activates an image integration of the camera CAM1 periodically (e.g., at a set timing interval), for which the first imaging trigger signal from the image triggering portion 181 may activate a strobe light timing or other mechanism to effectively freeze motion and correspondingly determine an exposure within the integration period. In such implementations, if no first imaging trigger signal is received during the integration period, a resulting image may be discarded, wherein if a first imaging trigger signal is received during the integration period, the resulting image may be saved and/or otherwise processed/analyzed to determine a relative position, as will be described in more detail below.

In various implementations, different types of end tools ETL may provide different types of outputs that may be utilized with respect to the image triggering portion 181. For example, in an implementation where the end tool ETL is a touch probe that is used for measuring a workpiece and that outputs a touch signal when it touches the workpiece (e.g., when the contact point CP contacts the workpiece), the image triggering portion 181 may be configured to input that touch signal or a signal derived therefrom as the at least one input signal that the timing of a first imaging trigger signal is determined based on. In various implementations where the end tool ETL is a touch probe, a central axis of the touch probe may be oriented along the scale imaging axis direction SIA (e.g., with the central axis of the touch probe corresponding to the end tool axis EA). As another example, in an implementation where the end tool ETL is a scanning probe that is used for measuring a workpiece and that provides respective workpiece measurement sample data corresponding to a respective sample timing signal, the image triggering portion 181 may be configured to input that respective sample timing signal or a signal derived therefrom as the at least one input signal. As another example, in an implementation where the end tool ETL is a camera that is used to provide a respective workpiece measurement image corresponding to a respective workpiece image acquisition signal, the image triggering portion 181 may be configured to input that workpiece image acquisition signal or a signal derived therefrom as the at least one input signal.

In the example implementation of FIG. 1, the end tool metrology position coordinates determination system 150 is configured with the XY scale 170 coupled to the end tool ETL. In addition, the first imaging configuration 160-1 is coupled to a stationary element STE (e.g., a frame arranged above and proximate to the robot 110) and defines a first reference position REF1. In an alternative implementation (e.g., as will be described in more detail below with respect to FIG. 4), an end tool metrology position coordinates determination system may be configured with the first imaging configuration 160-1 coupled to a movable arm configuration MAC proximate to the distal end of the movable arm configuration MAC, and the XY scale 170 coupled to a stationary element STE and defining a first reference position REF1.

In either case, as will be described in more detail below, the end tool metrology position coordinates determination system 150 may be configured such that when the moveable one of the XY scale 170 or the first imaging configuration 160-1 and the stationary one of the XY scale 170 or the first imaging configuration 160-1 are arranged in the operational configuration, and the movable arm configuration MAC is positioned with the XY scale 170 in a field of view FOV of the first imaging configuration 160-1, then the metrology position coordinate processing portion 190 is operable to determine a relative position between the movable one of the XY scale 170 or the first imaging configuration 160-1 and the first reference position REF1 with an accuracy level that is better than the robot accuracy, based on determining an image position of the identified at least one respective imageable feature in the acquired image. The determined relative position is indicative of the metrology position coordinates of the end tool position ETP at the image acquisition time, with an accuracy level that is better than the robot accuracy, at least for a vector component of the x and y metrology position coordinates that is at least one of transverse or perpendicular to the scale imaging axis direction SIA.

In various implementations, the end tool metrology position coordinates determination system 150 may be configured to determine the metrology position coordinates of the end tool position ETP at the image acquisition time, based on the determined relative position and a known coordinate position offset between the end tool position ETP and the movable one of the XY scale 170 or the first imaging configuration 160-1. It will be appreciated that such a system may have certain advantages over various alternative systems. For example, in various implementations a system such as that disclosed herein may be smaller and/or less expensive than alternative systems utilizing technologies such as laser trackers or photogrammetry for tracking robot movement/positions, and may also have higher accuracy in some implementations. The disclosed system also does not take up or obscure any part of the end tool working volume ETWV, such as alternative systems that may include a scale or fiducial on the ground or stage, or otherwise in the same area (e.g., in the end tool working volume ETWV) where workpieces may otherwise be worked on and/or inspected, etc.

Figure 2:
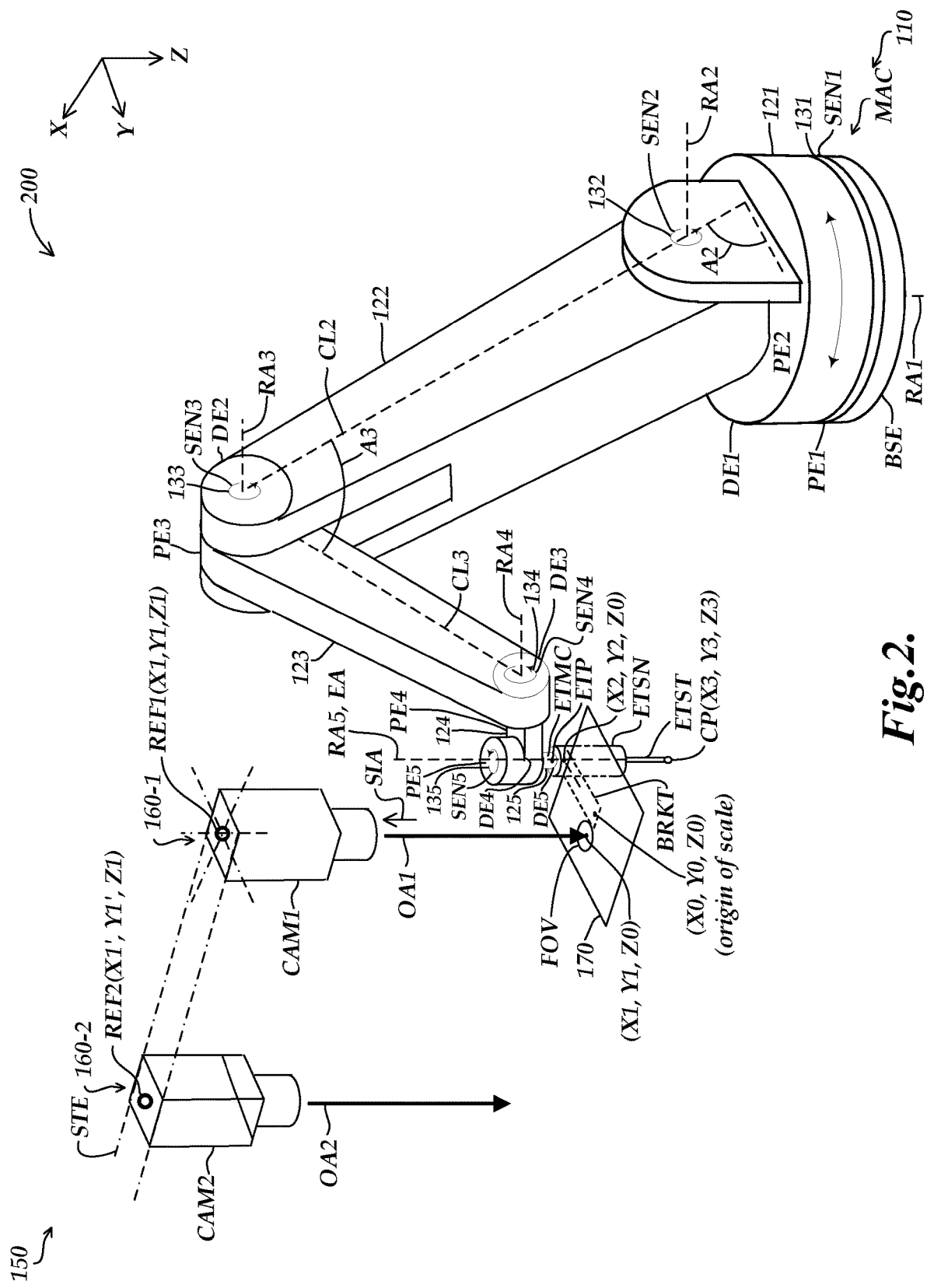
FIG. 2 is an isometric diagram of a portion of a second exemplary implementation of a robot system similar to the robot system of FIG. 1 including an articulated robot, in which a first imaging configuration is coupled to a stationary element.

FIG. 2 is an isometric diagram of a portion of a second exemplary implementation of a robot system 200 similar to the robot system 100 of FIG. 1 in which the first imaging configuration 160-1 is coupled to a stationary element STE (e.g., the stationary element STE of FIG. 1). It will be appreciated that certain numbered components (e.g., 1XX, 1XX' or 2XX) of FIG. 2 may correspond to and/or have similar operations as identically or similarly numbered counterpart components (e.g., 1XX) of FIG. 1, and may be understood to be similar or identical thereto and may otherwise be understood by analogy thereto and as otherwise described below. This numbering scheme to indicate elements having analogous and/or identical design and/or function is also applied to the following FIGS. 3-6.

In the configuration of FIG. 2 (i.e., similar to the configuration of FIG. 1), the stationary element STE that the first imaging configuration 160-1 is coupled to may comprise a frame arranged above the robot 110. The movable arm configuration MAC includes the arm portions 121-125 and the XY scale 170 is coupled to the end tool ETL. In various implementations, a bracket BRKT is utilized for coupling the XY scale 170 to the end tool ETL. In other configurations, other coupling configurations may be utilized for coupling the XY scale 170 to the end tool ETL. In various implementations (e.g., as illustrated in FIGS. 1 and 2) the XY scale 170 may be located primarily on one side of the end tool ETL or the stylus ETST. In various alternative implementations, the XY scale 170 may at least partially surround at least one of the end tool ETL or the stylus ETST in the scale plane.

In various implementations, the XY scale 170 may be coupled as close as practical to the contact point CP, such as with the scale plane located as close as possible to the contact point CP (e.g., so as to reduce the magnitude of certain types of position errors that may occur under certain circumstances). For example, if the scale imaging axis direction SIA is not aligned to be parallel with the optical axis OA1, there may be a difference between the position of the contact point CP as compared to the position indicated by the XY scale 170 (e.g., in an x-y plane), for which such differences may be reduced by coupling the XY scale 170 to the end tool ETL as close as practical to the contact point CP.

As illustrated in FIG. 2, the first arm portion 121 (e.g., an upper base portion) is mounted to the first motion mechanism 131 (e.g., including a rotary joint) at a proximal end PE1 of the first arm portion 121. The first motion mechanism 131 is located at an upper end of the lower supporting base portion BSE and has a rotary axis RA1 aligned along the scale imaging axis direction SIA such that the first arm portion 121 rotates in a plane that is perpendicular to the scale imaging axis direction SIA. In an implementation where the optical axis OA1 of the first imaging configuration 160-1 (e.g., and correspondingly the scale imaging axis direction SIA in the operational configuration) is parallel to the z axis, the first arm portion 121 may correspondingly rotate in an x-y plane that is perpendicular to the z axis. In various implementations, the position sensor SEN1 (e.g., a rotary encoder) may be utilized for determining the angular position (e.g., the angular orientation) of the first arm portion 121.

The second motion mechanism 132 (e.g., including a rotary joint) is located proximate to a distal end DE1 of the first arm portion 121. The second motion mechanism 132 has a rotary axis RA2 (e.g., which may be nominally aligned along a direction that is perpendicular to the optical axis OA1 and/or the scale imaging axis direction SIA). The second arm portion 122 is mounted to the second motion mechanism 132 at a proximal end PE2 of the second arm portion 122, such that the second arm portion 122 moves about the second motion mechanism 132 (e.g., in a plane that may be nominally parallel to the optical axis OA1 and/or the scale imaging axis direction SIA). In various implementations, the position sensor SEN2 (e.g., a rotary encoder) may be utilized for determining the angular position (e.g., in a plane that may be parallel to the optical axis OA1 and/or the scale imaging axis direction SIA) of the second arm portion 122.

The third motion mechanism 133 (e.g., including a rotary joint) is located at a distal end DE2 of the second arm portion 122. The third motion mechanism 133 has a rotary axis RA3 (e.g., which may be nominally aligned along a direction that is perpendicular to the optical axis OA1 and/or the scale imaging axis direction SIA). The third arm portion 123 is mounted to the third motion mechanism 133 at a proximal end PE3 of the third arm portion 123, such that the third arm portion 123 moves about the third motion mechanism 133 (e.g., in a plane that may be nominally parallel to the optical axis OA1 and/or scale imaging axis direction SIA). In various implementations, the position sensor SEN3 (e.g., a rotary encoder) may be utilized for determining the angular position (e.g., in a plane that may be parallel to the optical axis OA1 and/or scale imaging axis direction SIA) of the third arm portion 123.

The fourth motion mechanism 134 (e.g., including a rotary joint) is located at a distal end DE3 of the third arm portion 123. The fourth motion mechanism 134 has a rotary axis RA4 (e.g., which may be nominally aligned along a direction that is perpendicular to the optical axis OA1 and/or the scale imaging axis direction SIA). The fourth arm portion 124 is mounted to the fourth motion mechanism 134 at a proximal end PE4 of the fourth arm portion 124, such that the fourth arm portion 124 rotates (e.g., in a plane that may be nominally parallel to the optical axis OA1 and/or scale imaging axis direction SIA). In various implementations, the position sensor SEN4 (e.g., a rotary encoder) may be utilized for determining the angular position (e.g., in a plane that may be parallel to the optical axis OA1 and/or the scale imaging axis direction SIA) of the fourth arm portion 124.

The fifth motion mechanism 135 is located at a distal end DE4 of the fourth arm portion 124. As noted above, in some implementations, the fifth motion mechanism 135 (e.g., including a rotary joint) may be configured to rotate the fifth arm portion 125 about a rotary axis RA5 (e.g., which may be parallel to the scale imaging axis direction SAI and in some orientations may be parallel to the optical axis OA1, such as when in the operational configuration as so oriented by the rotation of the fourth arm portion 124 by the fourth motion mechanism 134, etc.). In such configurations, the fifth arm portion 125 may be mounted to the fifth motion mechanism 135 at a proximal end PE5 of the fifth arm portion 125. In some implementations, the fifth motion mechanism 135 may also or alternatively include a different type of motion mechanism (e.g., a linear actuator) that is configured to move the fifth arm portion 125 linearly (e.g., up and down in the scale imaging axis direction SIA when so oriented in the operational configuration). In various implementations, the fifth arm portion 125 may be designated as a terminal portion of the movable arm configuration MAC, wherein the distal end of the movable arm configuration MAC corresponds to the distal end DE5 of the fifth arm portion 125, where the end tool mounting configuration ETMC may be located. In an implementation where the fifth motion mechanism 135 includes a rotary joint and the scale imaging axis direction SIA is parallel to the z axis in the operational configuration, the XY scale 170 as coupled to the end tool ETL may correspondingly rotate in an x-y plane that is perpendicular to the z axis.

In various implementations, as noted above, the XY scale 170 may be located primarily on one side of the stylus or the end tool ETL (e.g., as illustrated in FIG. 2), and the end tool ETL may be configured to be rotated (e.g., by the fifth motion mechanism 135) so that the contact point CP of the end tool ETL may be moved into contact with a workpiece WP without the XY scale 170 interfering. More specifically, in a configuration where the XY scale 170 is located primarily on one side, when the contact point CP is moved toward a workpiece, in certain instances and for certain orientations the XY scale may inadvertently come into physical contact with the workpiece WP before the contact point CP can be moved into contact with the workpiece WP. In order to prevent such occurrences, the end tool ETL or a portion thereof may be rotated (e.g., by the motion mechanism 135) so as to rotate the XY scale 170 away from the workpiece WP so as to allow the contact point CP to come into contact with the workpiece WP without the XY scale 170 getting in the way or otherwise interfering.

In various implementations, different reference axes and lines may be designated for referencing certain movements, coordinates and angles of the components of the movable arm configuration MAC. As some specific examples, as illustrated in FIG. 2 the second and third arm portions 122 and 123 may each have designated center lines CL2 and CL3, respectively, passing down the centers of the respective arm portions. An angle A2 (e.g., which may correspond to an amount of rotation of the second motion mechanism 132) may be designated as occurring between the center line CL2 of the second arm portion 122 and plane (e.g., parallel to the scale plane in the operational configuration, which may be in an x-y plane when the optical axis OA1 is parallel to the z axis). An angle A3 may be designated as occurring between the center line CL2 of the second arm portion 122 and the center line CL3 of the third arm portion 123 (e.g., in accordance with an amount of rotation of the third motion mechanism 133 about the third rotary axis RA3). It will be appreciated that the other arm portions 121, 124 and 125 may similarly have corresponding reference lines and/or axes, etc., for referencing certain movements, coordinates and angles of the components of the movable arm configuration MAC.

In various implementations, the end tool ETL may be mounted (e.g., coupled) to the end tool mounting configuration ETMC proximate to the distal end DE5 of the fifth arm portion 125. The end tool ETL may be designated as having an end tool axis EA (e.g., passing through the middle and/or central axis of the stylus ETST), which may coincide with the fifth rotary axis RA5 of the fifth motion mechanism 135 and which may intersect with an extended line of the fourth rotary axis RA4 of the fourth motion mechanism 134. In various implementations, the end tool axis EA passes through the end tool position ETP, and has a known coordinate position offset from the XY scale 170, and in the operational configuration is parallel to the scale imaging axis direction SIA (e.g., such that the end tool ETL with the stylus ETST is oriented parallel to the scale imaging axis direction SIA). Correspondingly, there may be a known coordinate position offset between the end tool position ETP and the XY scale 170. For example, the XY scale 170 may have a designated reference point (e.g., at a center or edge of the XY scale 170) which has a known coordinate position offset (e.g., a known distance in a plane that is parallel to the scale plane or otherwise) from the end tool axis EA (e.g., and correspondingly from the end tool position ETP). In various implementations, such a known coordinate position offset may be expressed in terms of known offset components (e.g., a known x offset and a known y offset and/or a known distance combined with an angular orientation of the fifth arm portion 125 about the rotary axis RA5, such as may be determined from the position sensor SEN5).

In various implementations, the known coordinate position offset between the end tool position ETP and the XY scale 170 may be utilized as part of the process for determining the metrology position coordinates of the end tool position ETP. More specifically, as noted above, the end tool metrology position coordinates determination system 150 may be configured such that the metrology position coordinate processing portion 190 operates to determine a relative position between the XY scale 170 and the first reference position REF1 (i.e., as defined by the stationary first imaging configuration 160-1), based on determining an image position of the identified at least one respective imageable feature (i.e., of the XY scale 170) in the acquired image. The end tool metrology position coordinates determination system 150 may further be configured to determine the metrology position coordinates of the end tool position ETP, based on the determined relative position and a known coordinate position offset between the end tool position ETP and the movable XY scale 170. In one specific example implementation, the known coordinate position offset (e.g., expressed in terms of known offset components, such as a known x offset and a known y offset and/or a known distance combined with an angular orientation of the fifth arm portion 125 about the rotary axis RA5, such as may be determined from the position sensor SEN5) may be added to or otherwise combined with the determined relative position in order to determine the metrology position coordinates of the end tool position ETP.

As one specific example position coordinate configuration, in an implementation where in the operational configuration the scale imaging axis direction SIA is parallel to the z axis, the XY scale 170 may be designated as having a reference position (e.g., an origin location) at X0, Y0, Z0 (e.g., which, for an origin location, may have values of 0,0,0). In such a configuration, the reference location REF1 (i.e., as defined by the stationary first imaging configuration 160-1) may be at relative coordinates of X1, Y1, Z1, and a center of a corresponding field of view FOV (e.g., corresponding to an acquired image) may be at relative coordinates of X1, Y1, Z0. A location of the end tool axis EA in an x-y plane extending from the XY scale 170 may be designated as having relative coordinates of X2, Y2, Z0. The end tool position ETP may be designated as having coordinates of X2, Y2, Z2. In various implementations, the end tool ETL may have a contact point CP (e.g., at the end of an end tool stylus ETST for contacting a workpiece) which may be designated as having coordinates X3, Y3, Z3. In an implementation where the contact point CP of the end tool ETL does not vary in the x or y directions relative to the rest of the end tool, the X3 and Y3 coordinates may be equal to the X2 and Y2 coordinates, respectively.

In one specific example implementation, an acquired image may be analyzed by the metrology position coordinate processing portion 190 to determine a relative position (e.g., to determine the X1, Y1 coordinates corresponding to the center of the field of view FOV of the stationary first imaging configuration 160-1). Such a determination may be made in accordance with standard camera/scale image processing techniques (e.g., for determining a location of camera relative to a scale). Various examples of such techniques are described in U.S. Pat. Nos. 6,781,694; 6,937,349; 5,798,947; 6,222,940 and 6,640,008, each of which is hereby incorporated herein by reference in its entirety. In various implementations, such techniques may be utilized to determine the location of a field of view (e.g., as corresponding to a position of a camera) within a scale range (e.g., within the XY scale 170), as will be described in more detail below with respect to FIGS. 5 and 6. In various implementations, such a determination may include identifying at least one respective imageable feature included in the acquired image of the XY scale 170 and the related respective known XY scale coordinate location. Such a determination may correspond to determining a relative position between the XY scale 170 and the first reference position REF1 (i.e., as defined by the stationary first imaging configuration 160-1). The relative X2, Y2 coordinates (i.e., of the end tool position ETP) may then be determined according to the known coordinate position offset between the end tool position ETP and the XY scale 170 (e.g., adding known x and y position offset values to X1 and Y1 in order to determine X2 and Y2).

As noted above, in various implementations the determined relative position (e.g., corresponding to the determination of the X1, Y1 coordinates relative to the X0, Y0 coordinates) is indicative of the metrology position coordinates of the end tool position (e.g., the X2, Y2 coordinates) at the image acquisition time, with an accuracy level that is better than the robot accuracy, at least for a vector component of the x and y metrology position coordinates that is at least one of transverse or perpendicular to the scale imaging axis direction. In the above example, in a configuration with the scale imaging axis direction SIA being parallel to the z axis in the operational configuration, this may correspond to the accuracy level being better than the robot accuracy, at least for x and y metrology position coordinates in an x-y plane that is perpendicular to the z axis (or more generally, better than the robot accuracy for metrology position coordinates in a coordinate plane analogous to the x-y plane, but that is transverse to the z axis and not necessarily perfectly perpendicular to the z axis, in various implementations). More specifically, in such a configuration, a vector component of the x and y metrology position coordinates that is perpendicular to the scale imaging axis direction SIA may correspond to a vector represented by the component pair (X1-X0, Y1-Y0), or where X0 and Y0 equal 0, simply (X1, Y1).

In various implementations, the end tool metrology position coordinates determination system 150 may further include one or more additional imaging configurations. For example, as illustrated in FIG. 2, the end tool metrology position coordinates determination system 150 may include a second imaging configuration 160-2 having a second camera CAM2 and a second optical axis OA2 that is parallel to the direction of the scale imaging axis direction SIA when in the operational configuration. The second imaging configuration 160-2 may define a second reference position REF2 (e.g., having relative coordinates of X1', Y1' and Z1).

The second imaging configuration 160-2 may have an effective focus range REFP along its optical axis OA2. In such a configuration, the image triggering portion 181 may be further configured to input at least one input signal that is related to the end tool position ETP and determine the timing of a second imaging trigger signal based on the at least one input signal and output the second imaging trigger signal to the second imaging configuration 160-2. In various implementations, the second imaging configuration 160-2 may be configured to acquire a digital image of the XY scale 170 at an image acquisition time in response to receiving the second imaging trigger signal. The metrology position coordinate processing portion 190 may be further configured to input the acquired image and identify at least one respective imageable feature included in the acquired image of the XY scale 170 and the related respective known XY scale coordinate location.

In various implementations, the metrology position coordinate processing portion 190 may be operable to determine a relative position between the XY scale 170 and the second reference position REF2 with an accuracy level that is better than the robot accuracy, based on determining an image position of the identified at least one respective imageable feature in the acquired image. In such an implementation, the determined relative position is indicative of the metrology position coordinates of the end tool position ETP at the image acquisition time, with an accuracy level that is better than the robot accuracy, at least for a vector component of the x and y metrology position coordinates that is at least one of transverse or perpendicular to the scale imaging axis direction.

In various implementations, the at least one input signal that is input to the image triggering portion 181 includes one or more signals derived from the motion control system 140. In such configurations, the image triggering portion 181 may be configured to determine whether the XY scale 170 is aligned with the first or second imaging configuration 160-1 or 160-2 based on the one or more signals derived from the motion control system 140. If the XY scale 170 is determined to be aligned with the first imaging configuration 160-1 (e.g., such that a sufficient portion of the XY scale 170 is imaged by the first imaging configuration 160-1), the image triggering portion 181 is configured to output the first imaging trigger signal. Conversely, if the XY scale 170 is determined to be aligned with the second imaging configuration 160-2 (e.g., such that a sufficient portion of the XY scale 170 is imaged by the second imaging configuration 160-2), the image triggering portion 181 is configured to output the second imaging trigger signal. It will be appreciated that in such an implementation, the XY scale 170 may be in the operational configuration with respect to at least one of the first imaging configuration 160-1 or the second imaging configuration 160-2.

Figure 3:
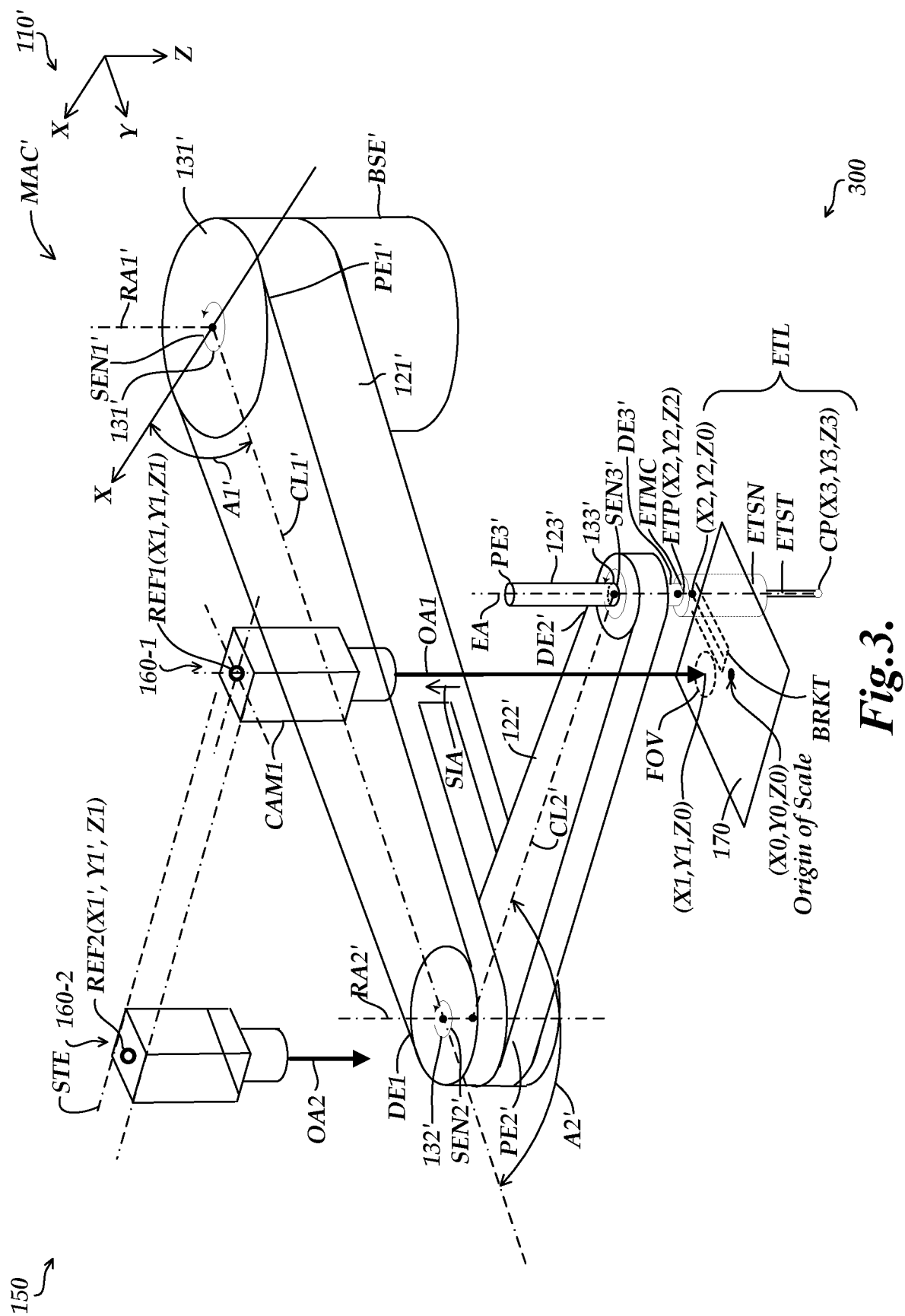
FIG. 3 is an isometric diagram of a portion of a third exemplary implementation of a robot system including a SCARA robot, in which a first imaging configuration is coupled to a stationary element.

FIG. 3 is an isometric diagram of a portion of a third exemplary implementation of a robot system 300 including a robot 110' (e.g., a SCARA robot), in which the first imaging configuration 160-1 is coupled to the stationary element STE proximate to the robot 110'. In the example of FIG. 3, the movable arm configuration MAC' includes a lower base portion BSE', arm portions 121'-123', motion mechanisms 131'-133', position sensors SEN1'-SEN3', and an end tool mounting configuration ETMC. Each of the arm portions 121'-123' have respective proximal ends PE1'-PE3' and respective distal ends DE1'-DE3'. In various implementations, some or all of the arm portions 121'-123' may be mounted to respective motion mechanisms 131'-133' at respective proximal ends PE1'-PE3' of the respective arm portions 121'-123'.

In the example of FIG. 3, some or all of the motion mechanisms 131'-133' (e.g., including rotary joints with corresponding rotary motors, linear motion mechanisms with linear actuators, etc.) may enable motion (e.g., rotary motion, linear motion, etc.) of the respective arm portions 121'-123' (e.g., about and/or along respective axes RA1'-RA3', etc.). In various implementations, the position sensors SEN1'-SEN3' (e.g., rotary encoders, linear encoders, etc.) may be utilized for determining the positions (e.g., angular orientations, linear positions, etc.) of the respective arm portions 121'-123'. In various implementations, the movable arm configuration MAC' may have a portion that is designated as a terminal portion (e.g., the third arm portion 123'). In the example configuration of FIG. 3, the end tool mounting configuration ETMC is located proximate to (e.g., located at) the distal end DE3' of the third arm portion 123' (e.g., designated as the terminal portion of the movable arm configuration MAC'), which corresponds to a distal end of the movable arm configuration MAC'. In various alternative implementations, a terminal portion of a movable arm configuration may be an element (e.g., a rotatable element, etc.) that is not an arm portion but for which at least part of the terminal portion corresponds to a distal end of the movable arm configuration, which an end tool mounting configuration ETMC may be located proximate to.

As noted above, in various implementations the end tool ETL may include the end tool sensing portion ETSN and the end tool stylus ETST with the contact point CP (e.g., for contacting a surface of a workpiece WP). The third motion mechanism 133' is located proximate to the distal end DE2' of the second arm portion 122'. As noted above, in some implementations, the third motion mechanism 133' (e.g., a rotary joint with a corresponding motor) may be configured to rotate the third arm portion 123' about a rotary axis RA3' (e.g., which may be parallel to the scale imaging axis direction SIA and/or the optical axis OA1' when in the operational configuration.) In some implementations, the third motion mechanism 133' may also or alternatively include a different type of motion mechanism (e.g., a linear actuator) that is configured to move the third arm portion 123' linearly (e.g., up and down in the scale imaging axis direction SIA, such as for causing the contact point CP to contact a surface point on a workpiece WP). In any case, the end tool ETL is mounted to (e.g., coupled to) the end tool mounting configuration ETMC, and has a corresponding end tool position ETP with corresponding coordinates (e.g., x, y and z coordinates). In various implementations, the end tool position ETP may correspond to or be proximate to the position of the end tool mounting configuration ETMC (e.g., at or proximate to the distal end DE3' of the third arm portion 123' which corresponds to the distal end of the movable arm configuration MAC').

As noted above, in various implementations the robot 110' is configured to move the movable arm configuration MAC' so as to move at least a portion of the end tool ETL (e.g., the contact point CP) that is mounted to the end tool mounting configuration ETMC along at least two dimensions (e.g., x and y dimensions) in an end tool working volume. In the example of FIG. 3, the portion of the end tool ETL (e.g., the contact point CP) is movable by the robot 110' along at least two dimensions (e.g., the x and y dimensions) by movement of the first and second arm portions 121' and 122', and may further be movable along a third dimension (e.g., the z dimension) by movement of the third arm portion 123' (e.g., utilizing a linear actuator as part of the third motion mechanism 133', etc.).

As noted above, the motion control system 140 of FIG. 1 is configured to control the end tool position ETP of the end tool ETL with a level of accuracy defined as a robot accuracy. More specifically, the motion control system 140 is generally configured to control the coordinates (e.g., x, y and z coordinates) of the end tool position ETP with the robot accuracy based at least in part on utilizing the motion mechanisms 131'-133' and position sensors SEN1'-SEN3' for sensing and controlling the positions of the arm portion 121'-123'. In various implementations, the motion control and processing system 140 may include motion mechanism control and sensing portions (e.g., motion mechanism control and sensing portions 141-143) that may respectively receive signals from the respective position sensors SEN1'-SEN3', for sensing the positions (e.g., angular positions, linear positions, etc.) of the respective arm portions 121'-123', and/or may provide control signals to the respective motion mechanisms 131'-133' (e.g., including motors, rotary joints, linear actuators, etc.) for moving the respective arm portions 121'-123'.

In the example implementation of FIG. 3, the movable arm configuration MAC' of the robot 110' may be configured such that the scale imaging axis direction SIA is generally parallel to a z axis direction. In such a configuration, the first motion mechanism 131' (e.g., located at an upper end of the supporting base portion BSE') may have its rotary axis RA1' aligned along the z axis direction (e.g., parallel to the scale imaging axis direction SIA) such that the first arm portion 121' moves about the first motion mechanism 131' in an x-y plane (e.g., parallel to the scale plane) that is perpendicular to the z axis. The first arm portion 121' is mounted to the first motion mechanism 131' at the proximal end PE1' of the first arm portion 121'. The second motion mechanism 132' is located at the distal end DE1' of the first arm portion 121'. The second motion mechanism 132' has its rotary axis RA2' that may be nominally aligned along the z axis direction (e.g., parallel to the scale imaging axis direction SIA). The second arm portion 122' is mounted to the second motion mechanism 132' at the proximal end PE2' of the second arm portion 122', such that the second arm portion 122' may move about the second motion mechanism 132' in an x-y plane that is nominally perpendicular to the z axis.

The third motion mechanism 133' (e.g., including a rotary joint) is located at the distal end DE2 of the second arm portion 122'. The third motion mechanism 133' has the rotary axis RA3' that may be nominally aligned along the z axis direction (e.g., parallel to the scale imaging axis direction SIA). The third arm portion 123' may be mounted to the third motion mechanism 133' at the proximal end PE3' of the third arm portion 123'. In various implementations, the position sensor SEN3 (e.g., including a rotary encoder) may be utilized for determining the angular position (e.g., the angular orientation) of the third arm portion 123'. As noted above, in some implementations, the third motion mechanism 133' may also or alternatively include a different type of motion mechanism (e.g., a linear actuator) that may be configured to move the third arm portion 123' up and down (e.g., in the z axis direction). The position sensor SEN3 may also or alternatively include a linear encoder for sensing the linear position (e.g., along the z axis direction) of the third arm portion 123'.

As noted above, the motion control system 140 is configured to control the end tool position ETP of the end tool ETL with a level of accuracy defined as a robot accuracy.

More specifically, in the example configuration of FIG. 3, the motion control system 140 is generally configured to control the x and y coordinates of the end tool position ETP with the robot accuracy based at least in part on sensing and controlling the angular positions (e.g., in an x-y plane) of the first and second arm portions 121' and 122' about the first and second motion mechanisms 131' and 132', respectively, using the position sensors SEN1' and SEN2'. In various implementations, the motion control and processing system 140 may include motion mechanism control and sensing portions (e.g., first and second motion mechanism control and sensing portions 141 and 142) that may receive signals from the position sensors SEN1' and SEN2', respectively, for sensing the angular positions of the first and second arm portions 121' and 122', and/or may provide control signals (e.g., to motors, etc.) in the first and second motion mechanisms 131' and 132' for rotating the first and second arm portions 121' and 122'.

In addition, the motion control and processing system 140 may generally be configured to control the z coordinate of the end tool position ETP with the robot accuracy based at least in part on sensing and controlling the linear position (e.g., along the z axis) of the third arm portion 123' using the third motion mechanism 133' (e.g., including a linear actuator) and the position sensor SEN3' (e.g., including a linear encoder). In various implementations, the motion control and processing system 140 may include a motion mechanism control and sensing portion (e.g., motion mechanism control and sensing portion 143) that may receive signals from the position sensor SEN3' (e.g., for sensing the linear position of the third arm portion 123'), and/or may provide control signals to the third motion mechanism 133' (e.g., including a linear actuator) to control the position (e.g., the z position) of the third arm portion 123'. As noted above, the motion control and processing system 140 may also receive signals from the end tool sensing portion ETSN.

As noted above, the end tool metrology position coordinates determination system 150 may be utilized to determine a relative position that is indicative of the metrology position coordinates of the end tool position ETP, with an accuracy level that is better than the robot accuracy, at least for a vector component of the x and y metrology position coordinates that is at least one of transverse or perpendicular to the scale imaging axis direction. In various implementations (e.g., in the configuration of FIG. 3 in which the scale imaging axis direction SIA is parallel to the z axis), this may correspond to the accuracy level being better than the robot accuracy, at least for x and y metrology position coordinates in an x-y plane that is perpendicular to the z axis.

The first imaging configuration 160-1 and the XY scale 170 generally operate as described above with respect to FIGS. 1 and 2. In the example configuration of FIG. 3, the first imaging configuration 160-1 includes the first camera CAM1 and has the optical axis OA1' that may be parallel to the scale imaging axis direction SIA (e.g., parallel to the z axis) when in the operational configuration. In various implementations, a VFL lens (e.g., a TAG lens) and a corresponding range REFP of the first imaging configuration 160-1 may be advantageously chosen such that the configuration limits or eliminates the need for macroscopic mechanical adjustments of the first imaging configuration 160-1 and/or adjustment of distances between components in order to change the effective focus position EFP. For example, in an implementation where an unknown amount of tilt or "sag" at the distal end DE2' of the second arm portion 122' may occur (e.g., due to the weight and/or specific orientations of the first and second arm portions 121' and 122', etc.), the precise focus distance from the first imaging configuration 160-1 to the XY scale 170 may be unknown and/or may vary with different orientations of the arms, etc. In such a configuration, it may be desirable for a VFL lens to be utilized that can scan or otherwise adjust the effective focus position EFP to determine the correct focus distance and accurately focus at the XY scale 170.

In the configuration of FIG. 3, different reference axes and lines may be designated for referencing certain movements, coordinates and angles of the components of the movable arm configuration MAC'. For example, the first and second arm portions 121' and 122' may each have designated horizontal center lines CL1' and CL2', respectively, passing down the centers of the respective arm portions. An angle A1' may be designated as occurring between the center line CL1' of the first arm portion 121' and a plane (e.g., an x-z plane) in accordance with an amount of rotation of the first motion mechanism 131' about the first rotary axis RA1'. An angle A2' may be designated as occurring between the horizontal center line CL1' of the first arm portion 121' and the horizontal center line CL2' of the second arm portion 122', in accordance with an amount of rotation of the second motion mechanism 132' about the second rotary axis RA2'.

In various implementations, an end tool axis EA (e.g., passing through the center of the third arm portion 123', the end tool position ETP, and/or the center of the end tool stylus ETST) may nominally intersect the center line CL2' of the second arm portion 122', and for which the end tool axis EA may generally be assumed to nominally coincide with the rotary axis RA2' (e.g., parallel to the z axis direction). In various implementations, the end tool axis EA passes through the end tool position ETP, and has a known coordinate position offset (e.g., for x and y coordinates) from the XY scale 170. Correspondingly, there may be a known coordinate position offset between the end tool position ETP and the XY scale 170. For example, the XY scale 170 may have a designated reference point (e.g., at a center or edge of the XY scale 170) which has a known coordinate position offset (e.g., a known distance) in an x-y plane from the end tool axis EA and correspondingly from the end tool position ETP. In various implementations, such a known coordinate position offset may be expressed in terms of a known x offset and a known y offset and/or a known distance combined with an angular orientation of the third arm portion 123' about the rotary axis RA3', such as may be determined from the position sensor SEN3'.

As one specific example position coordinate configuration, similar to the configuration described above with respect to FIG. 2, the XY scale 170 may be designated as having a reference position (e.g., an origin location) at X0, Y0, Z0 (e.g., which, for an origin location, may have values of 0,0,0). In such a configuration, the reference location REF1 (i.e., as defined by the stationary first imaging configuration 160-1) may be at relative coordinates of X1, Y1, Z1, and a center of a corresponding field of view FOV (e.g., corresponding to an acquired image) may be at relative coordinates of X1, Y1, Z0. A location of the end tool axis EA in an x-y plane extending from the XY scale 170 may be designated as having relative coordinates of X2, Y2, Z0. The end tool position ETP may be designated as having coordinates of X2, Y2, Z2. In various implementations, the contact point CP (e.g., at the end of an end tool stylus ETST for contacting a workpiece) may be designated as having coordinates X3, Y3, Z3. In an implementation where the contact point CP of the end tool ETL does not vary in the x or y directions relative to the rest of the end tool, the X3 and Y3 coordinates may be equal to the X2 and Y2 coordinates, respectively.

Similar to the examples described above with respect to FIG. 2, in various implementations the determined relative position (e.g., corresponding to the determination of the X1, Y1 coordinates relative to the X0, Y0 coordinates) is indicative of the metrology position coordinates of the end tool position (e.g., the X2, Y2 coordinates) at the image acquisition time, with an accuracy level that is better than the robot accuracy, at least for a vector component of the x and y metrology position coordinates that is at least one of transverse or perpendicular to the scale imaging axis direction. In various implementations, the end tool metrology position coordinates determination system 150 may further include one or more additional imaging configurations (e.g., the imaging configuration 160-2 defining a second reference position REF2 as described above with respect to FIG. 2), which may similarly be utilized for determining a relative position (e.g., between the XY scale 170 and the second reference position REF2).

As described above, in various implementations the robot 110' and the end tool metrology position coordinates determination system 150 may be arranged to at least nominally provide an operational configuration of the end tool metrology position coordinates determination system 150. The scale plane is defined to nominally coincide with the planar substrate of the XY scale 170, and a direction normal to the scale plane is defined as the scale imaging axis direction SIA. At least one of the XY scale 170 or the first imaging configuration 160-1 may be arranged with the optical axis OA1 of the first imaging configuration 160-1 at least one of parallel or nominally parallel to the direction of the scale imaging axis direction SIA, and with the scale plane located within the range of focus of the first imaging configuration 160-1 along the scale imaging axis direction SIA.

As described above, the robot 110' (i.e., including the movable arm configuration MAC') is configured to move the end tool ETL and the XY scale 170 (i.e., as coupled to the end tool) in a plane parallel to the scale plane, while the end tool metrology position coordinates determination system 150 may be at least nominally in the operational configuration. More specifically, in the example configurations of FIGS. 3 and 4, the SCARA robot 110' may perform such movement in a plane that is at least one of parallel or nominally parallel to the scale plane, for example, by utilizing one or both of the first or second motion mechanisms 131' or 132' to rotate the respective arm portion 121' or 122' about the respective rotary axis RA1' or RA2'. Such rotations of either or both arm portions 121' and 122' produce corresponding movement (e.g., at the distal end of the movable arm configuration MAC') of the end tool ETL and either the attached XY scale 170 (FIG. 3) or the attached first imaging configuration 160-1 (FIG. 4) in two dimensions (e.g., x and y dimensions) in a plane parallel to the scale plane (e.g., which allows the end tool metrology position coordinates determination system 150 to at least nominally remain in the operational configuration during such movements).

It will appreciated that in the example implementation of FIG. 3 as described above (e.g., for the general operations and orientations of the movable arm configuration MAC'), in various implementations, few or no adjustments may be required to at least nominally achieve the operational configuration. More specifically, as described above, the general movements of the movable arm configuration MAC' may be such that the scale imaging axis direction SIA is at least one of parallel or nominally parallel to the optical axis OA1 (e.g., and may remain so in accordance with the rotation of the first and second arm portions 121' and 122' at least one of in or nominally in an x-y plane). Such a configuration may reduce or eliminate the need for certain types of adjustments (e.g., reducing or eliminating the need for certain types of adjustments to the orientation of the XY scale 170, such as in the example implementations of FIGS. 1 and 2 where the fourth motion mechanism 134 may be utilized for adjusting the orientation of the XY scale 170, etc.). In various implementations, such features (e.g., including the scale imaging axis direction SIA remaining at least one of parallel or nominally parallel to the optical axis OA during movement of the movable arm configuration MAC' and thus requiring fewer adjustments to at least nominally maintain the operational configuration) may be considered as an advantage of the use of the movable arm configuration MAC' in conjunction with the end tool metrology position coordinates determination system 150.

Figure 4:
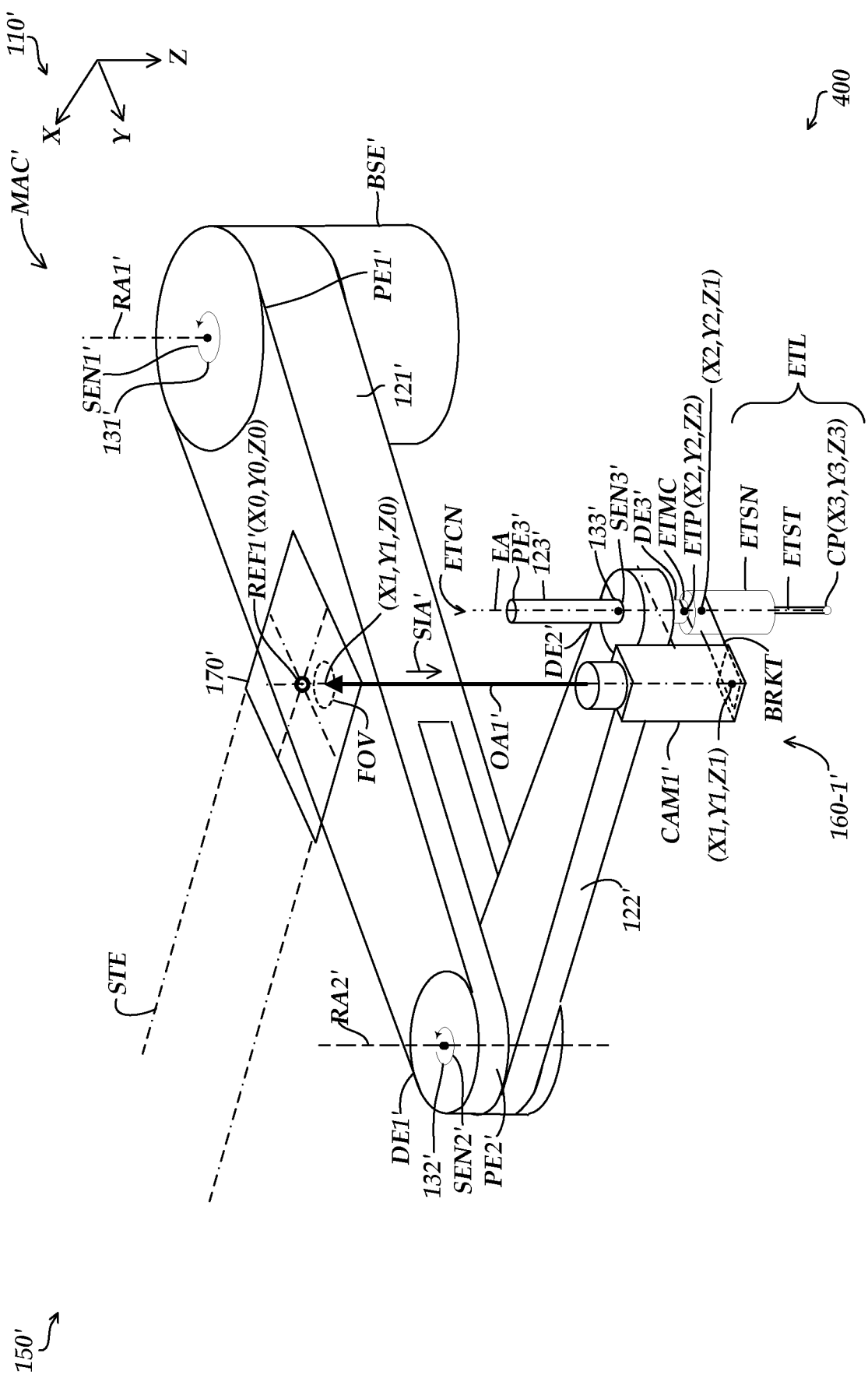
FIG. 4 is an isometric diagram of a portion of a fourth exemplary implementation of a robot system including a SCARA robot, in which an XY scale is coupled to a stationary element.

FIG. 4 is an isometric diagram of a portion of a fourth exemplary implementation of a robot system 400 including the robot 110' (e.g., a SCARA robot) and an end tool metrology position coordinates determination system 150' in which an XY scale 170' is coupled to the stationary element STE proximate to the robot 110' and defines a first reference position REF1'. In the configuration of FIG. 4, the first imaging configuration 160-1' is coupled to the end tool ETL (e.g., by a bracket BRKT or other coupling mechanism). In various implementations, the first imaging configuration 160-1' may be coupled to the end tool ETL such that its optical axis OA1' is as close as practical to being aligned with the contact point CP along the Z axis direction (e.g., so as to reduce the magnitude of certain types of position errors that may occur due to sag or tilt of the end tool ETL under certain circumstances). In any case, in an operational configuration of the end tool metrology position coordinates determination system 150', the first imaging configuration 160-1' is arranged with the optical axis OA1' of the first imaging configuration 160-1' parallel to the direction of the scale imaging axis direction SIA' and with the scale plane located within the range of focus of the first imaging configuration 160-1' along the scale imaging axis direction SIA'.

In various implementations, the XY scale 170' may be relatively large (e.g., covering an entire area above an end tool working volume, etc.). It will be appreciated that in some instances the XY scale 170' may be relatively larger than the XY scale 170 of FIGS. 1, 2 and 3, in that the XY scale 170' is not attached to the movable arm configuration MAC' and so does not have certain corresponding size or weight restrictions (e.g., the size of the XY scale 170' will not interfere with movements of the movable arm configuration MAC' in limited spatial areas and/or near a workpiece, etc.).

In various implementations, the end tool axis EA has a known coordinate position offset (e.g., for x and y coordinates) from the first imaging configuration 160-1'. Correspondingly, there may be a known coordinate position offset between the end tool position ETP and the first imaging configuration 160-1'. For example, the first imaging configuration 160-1' may have a designated reference point (e.g., at a center of the first imaging configuration 160-1') which has a known coordinate position offset (e.g., a known distance in an x-y plane) from the end tool axis EA and correspondingly from the end tool position ETP. In various implementations, such a known coordinate position offset may be expressed in terms of a known x offset and a known y offset and/or a known distance combined with an angular orientation of the third arm portion 123' about the rotary axis RA3', such as may be determined from the position sensor SEN3'.

In various implementations, the known coordinate position offset between the end tool position ETP and the first imaging configuration 160-1' may be utilized as part of the process for determining the metrology position coordinates of the end tool position ETP. More specifically, as noted above, the end tool metrology position coordinates determination system 150' may be configured such that the metrology position coordinate processing portion 190 operates to determine a relative position between the first imaging configuration 160-1' and the first reference position REF1' (i.e., as defined by the stationary XY scale 170'), based on determining an image position of an identified at least one respective imageable feature (i.e., of the XY scale 170') in the acquired image. The end tool metrology position coordinates determination system 150' may further be configured to determine the metrology position coordinates of the end tool position ETP, based on the determined relative position and a known coordinate position offset between the end tool position ETP and the movable first imaging configuration 160-1'. In one specific example implementation, the known coordinate position offset (e.g., expressed in terms of a known x offset and a known y offset and/or a known distance combined with an angular orientation of the third arm portion 123' about the rotary axis RA3', such as may be determined from the position sensor SEN3') may be added to or otherwise combined with the determined relative position in order to determine the metrology position coordinates of the end tool position ETP.

As one specific example position coordinate configuration, the XY scale 170' may be designated as having a reference location REF1' (e.g., an origin location) at X0, Y0, Z0 (e.g., which may have values of 0,0,0). The first imaging configuration 160-1' may be at a location with relative coordinates of X1, Y1, Z1, and a center of a corresponding field of view FOV (e.g., as captured in an acquired image) may be at relative coordinates of X1, Y1, Z0. A location of the end tool axis EA in an x-y plane extending from the first imaging configuration 160-1' may be designated as having relative coordinates of X2, Y2, Z1. The end tool position ETP may be designated as having coordinates of X2, Y2, Z2. In various implementations, the contact point CP (e.g., at the end of the end tool stylus ETST for contacting a workpiece) may be designated as having coordinates X3, Y3, Z3. In an implementation where the contact point CP of the end tool ETL does not vary in direction (e.g., in the x or y directions) relative to the rest of the end tool, the X3 and Y3 coordinates may be equal to the X2 and Y2 coordinates, respectively. It will be understood that some implementations may include additional respective XY scales analogous to the XY scale 170', which may be designated as having a having respective reference locations (e.g., analogous to but different from the reference location REF1'.) In such implementations, the XY scales in addition to the "first" XY scale 170' (e.g., second XY scale, third XY scale, and so on) may be associated with respective high accuracy end tool metrology position coordinates determination volumes at respective locations within the overall working volume of a robot.

In various implementations, the robot system 400 of FIG. 4 may have certain different design considerations and aspects as compared to the robot system 300 of FIG. 3 (e.g., related to a possible vertical displacement or sag at the distal ends DE1' and DE2' of the first and second arm portions 121' and 122', respectively). In an implementation where such displacement or sag may occur (e.g., due to the weight and/or different orientations of the arm portions, imaging configuration 160-1', etc.), a particularly undesirable effect may be experienced in the robot system 400 of FIG. 4 with respect to the field of view FOV of the first imaging configuration 160-1' being correspondingly shifted. More specifically, such vertical displacement or sag may cause a relatively significant shift/change in the location of the field of view FOV on the XY scale 170' (e.g., corresponding to a shift of the orientation of the optical axis OA1' away from parallel to the scale imaging axis direction SIA, and thus farther away from the operational configuration), which may result in a relatively significant error in the determined relative position and the corresponding metrology position coordinates of the end tool position ETP. Due to such issues, in certain implementations the configuration of the robot system 300 of FIG. 3 may be considered to have corresponding advantages over the robot system 400 of FIG. 4.

Figure 5:
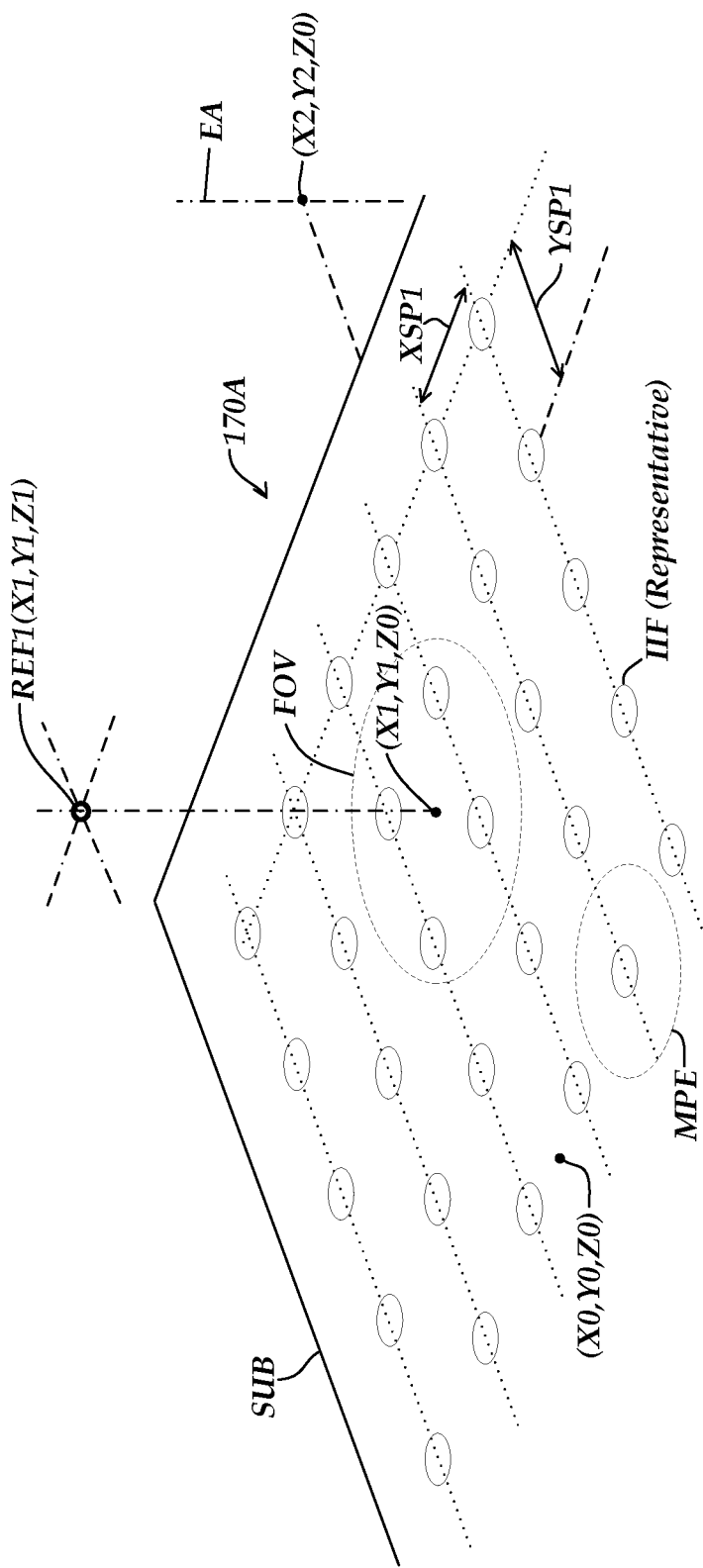
FIG. 5 is an isometric diagram of an exemplary implementation of an incremental XY scale.

FIG. 5 is an isometric diagram of an exemplary implementation of an incremental XY scale 170A (e.g., utilizable as the XY scale 170 or 170' as described above). As noted above, in various implementations, the XY scale 170A comprises a nominally planar substrate SUB (e.g., arranged nominally perpendicular to the scale imaging axis direction SIA when in the operational configuration) and a plurality of respective imageable features IIF that are distributed on the substrate SUB, wherein the respective imageable features IIF are located at respective known XY scale coordinates (e.g., x and y coordinates) on the XY scale 170A (i.e., thus each corresponding to a known XY scale coordinate location). In the example implementation of FIG. 5, the array of incremental imageable features IIF are evenly spaced. In various implementations, the incremental XY scale 170A may have a periodicity that is smaller than 100 microns (e.g., for which periodic spacings Xsp1 and Ysp1 between the incremental imageable features IIF, such as along respective x and y axes, may each be less than 100 microns). In various implementations, the position information that is determined utilizing the incremental XY scale 170A may have an accuracy of at least 10 microns. In contrast to a robot accuracy that may be approximately 100 microns in certain implementations, the accuracy determined utilizing such an XY scale 170A may be at least 10× that of the robot accuracy. In one specific example implementation, the incremental XY scale 170A may have an even higher periodicity of approximately 10 microns, for which, if the magnification of the first imaging configuration 160-1 is approximately 1×, and interpolation is performed by a factor of 10×, then an approximately 1 micron accuracy may be achieved. Such a configuration would have an approximately 100× improvement in accuracy over a robot accuracy of approximately 100 microns.

In various implementations, a location of a field of view FOV of the first imaging configuration 160-1 within the incremental XY scale 170A may provide an indication of a relative position between the XY scale 170A and the first reference position REF1. In various implementations, the first imaging configuration 160-1 may be utilized in combination with the incremental XY scale 170A as part of a camera/scale image processing configuration. For example, the metrology position coordinate processing portion 190 (FIG. 1) may determine a relative incremental position between the XY scale 170A and the first reference position REF1 based on the location of the field of view FOV within the incremental XY scale 170A, as indicated by the portion of the XY scale 170A in the acquired image, and as is known in the art for camera/scale image processing techniques (e.g., as described in the previously incorporated references). In various implementations, the incremental XY scale 170A may be of various sizes relative to the field of view FOV (e.g., the incremental XY scale 170A may be at least 4×, 10×, 20×, etc., larger than the field of view FOV).

In various implementations, the incremental position indicated by the XY scale 170A may be combined with position information from the robot 110 or 110' to determine a relatively precise and/or absolute position. For example, the position sensors SEN1 and SEN2 or SEN1' and SEN2' (e.g., rotary encoders) of the robot 110 or 110' may indicate the end tool position ETP with the robot accuracy, for which the incremental position indicated by the XY scale 170A may be utilized to further refine the determined end tool position ETP to have an accuracy that is better than the robot accuracy. In one such configuration, the metrology position coordinate processing portion 190 may be configured to identify one or more respective imageable features IIF included in the acquired image of the XY scale 170A based on the image positions of the one or more imageable features IIF in the acquired image and based on robot position data derived from the motion control system 140 corresponding to the image acquisition time.

In such configurations, the respective imageable features IIF of the XY scale 170A may comprise a set of similar imageable features IIF that are distributed on the substrate such that they are spaced apart from one another at regular intervals by a distance that is more than a maximum position error that is allowed within the robot accuracy. As illustrated in FIG. 5, the imageable features IIF are spaced apart (e.g., at spacings Xsp1 and Ysp1) by more than a maximum position error MPE as represented by a circle surrounding a representative imageable feature IIF. It will be appreciated that in such a configuration, the robot accuracy for the position determination is sufficient to determine the location with an accuracy that is greater than the spacing between the imageable features IIF. More specifically, in various implementations, a single imageable feature IIF on the XY scale 170A (e.g., wherein the imageeable features are all at known metrology position coordinates, such as known x and y metrology position coordinates, on the XY scale 170A according to the even spacings across the scale) may thus be identified by the robot position data with sufficient accuracy so that no two imageable features IIF may be confused with one another. In such a configuration, the location of a single imageable feature IIF in the acquired image may then be utilized to further refine the end tool position ETP to have an accuracy that is better than the robot accuracy, at least for a vector component of the x and y metrology position coordinates that is at least one of transverse or perpendicular to the scale imaging axis direction (e.g., at least for x and y metrology position coordinates of the end tool position ETP in an x-y plane that is perpendicular to the z axis).

As described above with respect to FIGS. 2 and 3, in certain specific example implementations, the XY scale 170A may be designated as having a reference position (e.g., an origin location) at X0, Y0, Z0 (e.g., which, for an origin location, may have values of 0,0,0). In such a configuration, the reference location REF1 (i.e., as defined by the stationary first imaging configuration 160-1) may be at relative coordinates of X1, Y1, Z1, and a center of a corresponding field of view FOV (e.g., as captured in an acquired image) may be at relative coordinates of X1, Y1, Z0. A location of the end tool axis EA (e.g., in an x-y plane extending from the XY scale 170) may be designated as having relative coordinates of X2, Y2, Z0. The end tool position ETP may be designated as having coordinates of X2, Y2, Z2.

In operation, an acquired image may be analyzed by the metrology position coordinate processing portion 190 to determine the X1, Y1 coordinates corresponding to the center of the field of view FOV of the stationary first imaging configuration 160-1. In various implementations, such a determination may be made in accordance with standard camera/scale image processing techniques, for determining a location of a field of view (e.g., corresponding to a location of a camera) within a scale range (e.g., within the XY scale 170A). It will be appreciated that in accordance with standard camera/scale image processing techniques, the reference position/origin location X0, Y0, Z0 is not required to be in the field of view FOV for such a determination to be made (i.e., the relative position may be determined from the scale information at any location along the XY scale 170A, as provided in part by the scale elements comprising the evenly spaced incremental imageable features IIF). In various implementations, such a determination may include identifying at least one respective imageable feature included in the acquired image of the XY scale 170 and the related respective known XY scale coordinate location. Such a determination may correspond to determining a relative position between the XY scale 170 and the first reference position REF1 (i.e., as defined by the stationary first imaging configuration 160-1). The relative X2, Y2 coordinates (i.e., of the end tool position ETP) may then be determined according to the known coordinate position offset between the end tool position ETP and the XY scale 170 (e.g., adding the x and y position offset values to X1 and Y1 in order to determine X2 and Y2).

A specific illustrative example of combining the position information from the robot 110 or 110' with the incremental position information indicated by the XY scale 170A to determine a relatively precise and/or absolute position is as follows. As illustrated in FIG. 5, the acquired image may indicate that the center of the field of view FOV is in the middle of four incremental imageable features IIF, but may not indicate which specific four incremental imageable features IIF of the XY scale 170 are included in the image. The position information from the robot 110 or 110' may be accurate enough to provide such information, for which the specific four incremental imageable features IIF of the XY scale 170A may be identified (e.g., based in part on the principles noted above by which the imageable features IIF are spaced apart by more than a maximum position error as represented by a representative circular area MPE so that each imageable feature IIF may be uniquely identified). The acquired image may then be analyzed by the metrology position coordinate processing portion 190 to determine precisely where the center of the field of view (i.e., at the coordinates X1, Y1, Z0) occurs within that section of the XY scale (i.e., which includes the specific four incremental imageable features IIF). The process may then continue as indicated above (e.g., for correspondingly determining the X2 and Y2 coordinates of the end tool position ETP, etc.).

Figure 6:
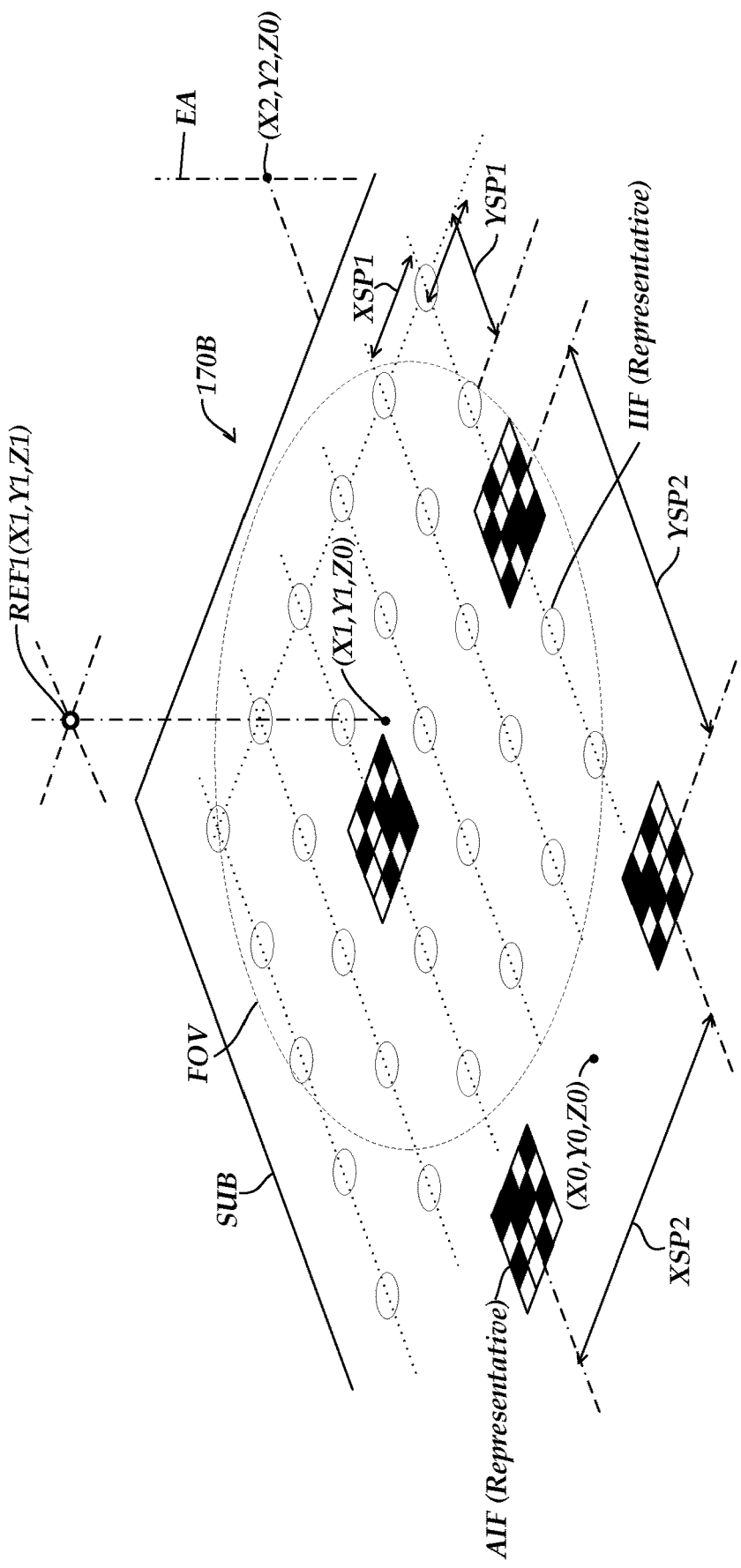
FIG. 6 is an isometric diagram of an exemplary implementation of an absolute XY scale.

FIG. 6 is an isometric diagram of an exemplary implementation of an absolute XY scale 170B (e.g., utilizable as the XY scale 170 or 170' as described above). In the example of FIG. 6, similar to the incremental XY scale 170A, the absolute XY scale 170B includes an array of evenly spaced incremental imageable features IIF, and also includes a set of absolute imageable features AIF having unique identifiable patterns (e.g., a 16-bit pattern). In various implementations, the imageable features IIF and AIF are all located at respective known XY scale coordinates (e.g., x and y coordinates) on the XY scale (i.e., thus each corresponding to a known XY scale coordinate location).

In operation, a location of a field of view FOV of the first imaging configuration 160-1 within the absolute XY scale 170B (i.e., as included in a captured image) provides an indication of an absolute position between the XY scale 170B and the first reference position REF1. In the implementation of FIG. 6, the set of absolute imageable features AIF are distributed on the substrate SUB such that they are spaced apart (e.g., at spacings Xsp2 and Ysp2) by less than a distance corresponding to a distance across a field of view FOV of the first imaging configuration 160-1 (i.e., so that at least one absolute imageable feature AIF will always be included in a field of view). In operation, the metrology position coordinate processing portion 190 is configured to identify at least one respective absolute imageable feature AIF included in the acquired image of the XY scale 170B based on the unique identifiable pattern of the respective absolute imageable feature AIF. It will be appreciated that such implementations are able to independently determine an absolute position that is indicative of the end tool position ETP with an accuracy that is better than the robot accuracy, at least for a vector component of the x and y metrology position coordinates that is at least one of transverse or perpendicular to the scale imaging axis direction (e.g., at least for x and y metrology position coordinates of the end tool position ETP in an x-y plane that is perpendicular to the z axis), and which in contrast to the incremental XY scale 170B may not require combining with position information from the robot 110 or 110' to determine the absolute position.

A specific illustrative example of utilizing the absolute imageable features AIF to determine a relatively precise and absolute position is as follows. As illustrated in FIG. 6, the acquired image may indicate that the center of the field of view FOV is in the middle of a number of incremental imageable features IIF. The position information from the included two absolute imageable features AIF indicates which section of the XY scale 170B the image includes, for which the included incremental imageable features IIF of the XY scale 170 may also be identified. The acquired image may accordingly be analyzed by the metrology position coordinate processing portion 190 to determine precisely where the center of the field of view (i.e., at the coordinates X1, Y1, Z0) occurs within that section of the XY scale (i.e., which includes the two absolute imageable features and the incremental imageable features IIF). The process may then continue as indicated above (e.g., for correspondingly determining the X2 and Y2 coordinates of the end tool position ETP, etc.).

Figure 7A:
FIGS. 7A and 7B are flow diagrams illustrating exemplary implementations of routines for operating a robot system including a robot and an end tool metrology position coordinates determination system.
Figure 7B:
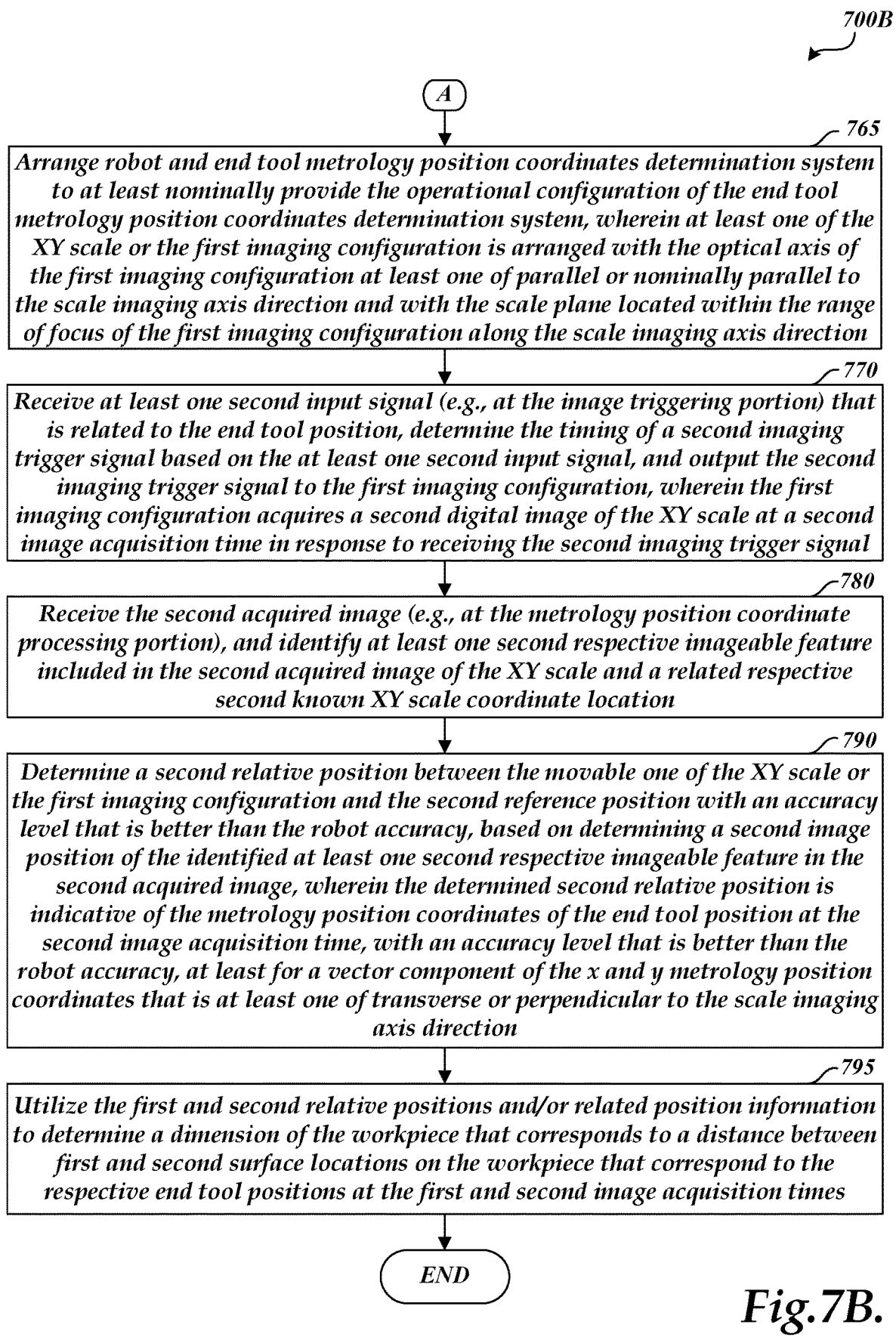

FIGS. 7A and 7B are flow diagrams illustrating exemplary implementations of routines 700A and 700B for operating a robot system including a robot and an end tool metrology position coordinates determination system. As shown in FIG. 7A, at a decision block 710, a determination is made as to whether the robot system is to be operated in an end tool metrology position coordinates mode. In various implementations, a selection and/or activation of an end tool metrology position coordinates mode or a standard robot position coordinates mode may be made by a user and/or may be automatically made by the system in response to certain operations and/or instructions. For example, in one implementation an end tool metrology position coordinates mode may be entered (e.g., automatically or in accordance with a selection by a user) when the robot moves into a particular position (e.g., moves an end tool from a general area where assembly or other operations are performed to a more specific area where workpiece inspection operations are typically performed, and/or where the end tool metrology position coordinates mode would otherwise be utilized).

In various implementations, such modes may be implemented by an external control system ECS (e.g., such as the external control system ECS of FIG. 1 utilizing a standard robot position coordinates mode portion 149 and an end tool metrology position coordinates mode portion 192). In various implementations, a hybrid mode may be operated either independently or as part of an end tool metrology position coordinates mode and/or may be implemented as a switching between the modes, as will be described in more detail below with respect to FIG. 8.

If at the decision block 710 it is determined that the robot system is not to be operated in an end tool metrology position coordinates mode, the routine proceeds to a block 715, where the robot system is operated in a standard robot position coordinates mode. As part of the standard robot position coordinates mode, the position sensors (e.g., rotary encoders, linear encoders, etc.) of the robot are utilized to control and determine the robot movements and corresponding end tool position with the robot accuracy (e.g., which is based at least in part on the accuracy of the position sensors of the robot). As noted above with respect to FIGS. 1-6, the position sensors of the robot may indicate the position of the movable arm configuration MAC or MAC' (e.g., the positions of the arm portions) with a lower degree of accuracy than the position information that is determined utilizing the XY scale. In general, the robot position coordinates mode may correspond to an independent and/or standard mode of operation for the robot (e.g., a mode in which the robot is operated independently, such as when an end tool metrology position coordinates determination system is not active or is otherwise not provided).

If the robot system is to be operated in an end tool metrology position coordinates mode, the routine proceeds to a block 720, where the robot and the end tool metrology position coordinates determination system are arranged to at least nominally provide an operational configuration of the end tool metrology position coordinates determination system. A scale plane is defined to nominally coincide with the planar substrate of the XY scale, and a direction normal to the scale plane is defined as a scale imaging axis direction. At least one of the XY scale or the first imaging configuration is arranged with the optical axis of the first imaging configuration at least one of parallel or nominally parallel to the direction of the scale imaging axis direction and with the scale plane located within the range of focus of the first imaging configuration along the scale imaging axis direction.

As described above, in various implementations, this process for at least nominally achieving the operational configuration may include making various adjustments (e.g., to the positions of the arm portions of the movable arm configuration MAC, etc.). As one specific example, in the implementations of FIGS. 1 and 2, the fourth motion mechanism 134 may be operated to rotate the fourth arm portion 124 so as to rotate the XY scale 170 to cause the scale imaging axis direction SIA to be at least one of parallel or nominally parallel to the optical axis OA1. In certain implementations, such adjustments may be made automatically (e.g., a circuit, routine, etc., may be utilized to continually monitor the orientation of the fourth arm portion 124 and to utilize the fourth motion mechanism 134 to continually adjust the orientation to cause the XY scale 170 to be approximately level or otherwise have the scale imaging axis direction SIA be at least one of parallel or nominally parallel to the optical axis OA1). In various implementations, various adjustments may be made to the first imaging configuration 160-1 (e.g., the magnification and/or range of focus may be adjusted, etc.) so as to cause the scale plane to be located within the range of focus of the first imaging configuration 160-1 along the scale imaging axis direction SIA. In certain other implementations (e.g., in the example configurations of FIGS. 3 and 4), fewer or no adjustments may sometimes be required to achieve the operational configuration (e.g., the configuration of the movable arm configuration MAC' may be such that the scale imaging axis direction SIA is at least nominally parallel to the optical axis OA1, in accordance with the rotation of the first and second arm portions 121' and 122' nominally in an x-y plane in certain implementations).

At a block 730, at least one input signal is received (e.g., at an image triggering portion) that is related to an end tool position of the robot. A timing is determined of a first imaging trigger signal based on the at least one input signal and the first imaging trigger signal is output to a first imaging configuration. The first imaging configuration acquires a digital image of an XY scale at an image acquisition time in response to receiving the first imaging trigger signal. In various implementations, different types of end tools may provide different types of outputs that may be utilized with respect to the at least one input signal. For example, in an implementation where the end tool is a touch probe that is used for measuring a workpiece and that outputs a touch signal when it touches the workpiece, that touch signal or a signal derived therefrom may be input as the at least one input signal that the timing of a first imaging trigger signal is determined based on. As another example, in an implementation where the end tool is a scanning probe that is used for measuring a workpiece and that provides respective workpiece measurement sample data corresponding to a respective sample timing signal, that respective sample timing signal or a signal derived therefrom may be input as the at least one input signal. As another example, in an implementation where the end tool is a camera that is used to provide a respective workpiece measurement image corresponding to a respective workpiece image acquisition signal, that workpiece image acquisition signal or a signal derived therefrom may be input as the at least one input signal.

At a block 740, the acquired image is received (e.g., at a metrology position coordinate processing portion), and at least one respective imageable feature included in the acquired image of the XY scale and the related respective known XY scale coordinate location are identified. At a block 750, a relative position between a movable one of the XY scale or the first imaging configuration and the first reference position is determined with an accuracy level that is better than a robot accuracy, based on determining an image position of the identified at least one respective imageable feature in the acquired image. The determined relative position is indicative of the metrology position coordinates of the end tool position at the image acquisition time, with an accuracy level that is better than the robot accuracy, at least for a vector component of the x and y metrology position coordinates that is at least one of transverse or perpendicular to the scale imaging axis direction. At a block 760, determined position information (e.g., the determined relative position, the determined metrology position coordinates of the end tool position and/or other related determined position information) is utilized for a designated function (e.g., for workpiece measurement, positioning control of the movable arm configuration of the robot, etc.). As part of such operations or otherwise, the routine may then proceed to a point A, where in various implementations the routine may end, or may otherwise continue as will be described in more detail below with respect to FIG. 7B.

As indicated in FIG. 7B, the routine 700B may continue from the point A to a block 765. As will be described in more detail below, as part of the routine 700B, the determined position information (e.g., from the block 760) may correspond to or otherwise be utilized for determining a first surface location on a workpiece, and for which a second surface location on the workpiece may then be determined (e.g., as part of a workpiece measurement). At the block 765, the robot and the end tool metrology position coordinates determination system are arranged to at least nominally provide the operational configuration of the end tool metrology position coordinates determination system, wherein at least one of the XY scale or the first imaging configuration is arranged with the optical axis of the first imaging configuration at least one of parallel or nominally parallel to the direction of the scale imaging axis direction and with the scale plane located within the range of focus of the first imaging configuration along the scale imaging axis direction. For example, in the implementation of FIGS. 1 and 2, this may correspond to the movable arm configuration MAC moving the end tool ETL (e.g., and contact point CP) proximate to (e.g., above) a second surface location on a workpiece, for which an adjustment may be made (e.g., by the fourth motion mechanism 134 for adjusting the orientation of the XY scale 170) in order to at least nominally achieve the operational configuration proximate to the second surface location on the workpiece.

At a block 770, at least one second input signal is received (e.g., at the image triggering portion) that is related to the end tool position, and the timing of a second imaging trigger signal is determined based on the at least one second input signal. The second imaging trigger signal is output to the first imaging configuration, wherein the first imaging configuration acquires a second digital image of the XY scale at a second image acquisition time in response to receiving the second imaging trigger signal. At a block 780, the acquired image is received (e.g., at the metrology position coordinate processing portion), and at least one second respective imageable feature included in the second acquired image of the XY scale and a related respective second known XY scale coordinate location are identified.

At a block 790, a second relative position between the movable one of the XY scale or the first imaging configuration and the second reference position is determined with an accuracy level that is better than the robot accuracy, based on determining a second image position of the identified at least one second respective imageable feature in the second acquired image. The determined second relative position is indicative of the metrology position coordinates of the end tool position at the second image acquisition time, with an accuracy level that is better than the robot accuracy, at least for a vector component of the x and y metrology position coordinates that is at least one of transverse or perpendicular to the scale imaging axis direction. The second relative position is different than the first relative position, and corresponds to a second surface location on the workpiece that is different than the first surface location (e.g., and for which the first respective imageable feature may not be included in the second acquired image and/or the second respective imageable feature may not be included in the first acquired image). Such techniques are noted to be distinct from techniques utilizing fiducials or other reference marks (e.g., for which the same fiducial or reference mark is required to be in each image, as compared to an XY scale 170 for which position information may be determined across the entire range of the XY scale 170, and correspondingly for any portion of the XY scale 170 that is included in an image corresponding to a field of view FOV of an imaging configuration 160).

At a block 795, the first and second relative positions and/or related position information is utilized to determine a dimension of the workpiece that corresponds to a distance between the first and second surface locations on the workpiece that correspond to the respective end tool positions (e.g., as indicating the contact point positions when contacting the respective first and second surface locations on the workpiece, etc.) at the first and second image acquisition times. It will be appreciated that rather than using the position sensors (e.g., rotary encoders, linear encoders, etc.) of the robot to determine the first and second surface locations on the workpiece with the robot accuracy, more accurate position information may be determined utilizing the techniques as described above. More specifically, the determination of the first and second surface locations (i.e., as corresponding to first and second locations on the XY scale for which a precise distance between such locations may be determined utilizing the techniques as described above in accordance with the accuracy of the XY scale) allows the corresponding dimension on the workpiece between the first and second surface locations to be determined with a high degree of accuracy.

Figure 8:
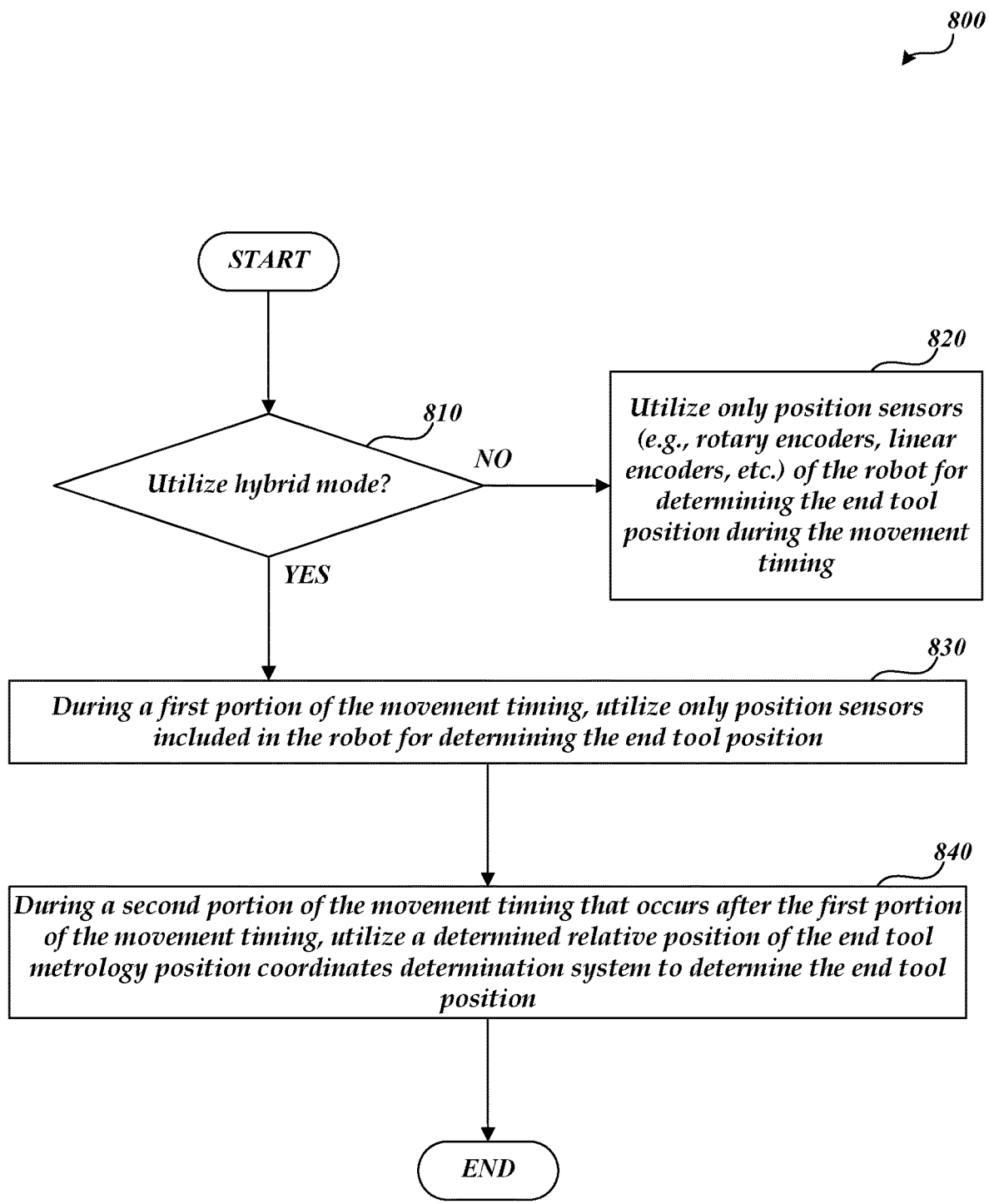
FIG. 8 is a flow diagram illustrating one exemplary implementation of a routine for determining an end tool position in which position sensors may be utilized during a first portion of a movement timing and a determined relative position of an end tool metrology position coordinates determination system may be utilized during a second portion of a movement timing.

FIG. 8 is a flow diagram illustrating one exemplary implementation of a routine 800 for determining an end tool position in which different techniques may be utilized during different portions of a movement timing. In general, during the movement timing, one or more arm portions of the robot are moved from first positions to second positions (e.g., which may include rotating one or more arm portions around motion mechanisms from first rotary orientations to second rotary orientations). As shown in FIG. 8, at a decision block 810, a determination is made as to whether a hybrid mode will be utilized for determining the end tool position during the movement timing. In various implementations, a hybrid mode may also be representative of a process which includes switching between the end tool metrology position coordinates mode and the standard robot position coordinates mode, as described above with respect to FIG. 7A. If the hybrid mode is not to be utilized, the routine continues to a block 820, where the position sensors (e.g., rotary encoders, linear encoders, etc.) of the robot (e.g., of the movable arm configuration) are solely utilized for determining the end tool position during the movement timing.

If the hybrid mode is to be utilized, the routine proceeds to a block 830, for which, during a first portion of a movement timing, the position sensors included in the robot (e.g., included in the movable arm configuration of the robot) are utilized for determining the end tool position. During such operations, a relative position of an end tool metrology position coordinates determination system may not be determined and/or is otherwise not utilized to determine the end tool position. At a block 840, during a second portion of the movement timing that occurs after the first portion of the movement timing, a determined relative position of the end tool metrology position coordinates determination system is utilized to determine the end tool position. It will be appreciated that such operations enable the system to perform initial/fast/coarse movement of the end tool position during the first portion of the movement timing, and to perform more accurate final/slower/fine movement of the end tool position during the second portion of the movement timing.

It will be understood that, although the element name "XY scale" has been used in this disclosure with reference to the elements 170, 170', 170A, 170B and the like, this element name is exemplary only, and not limiting. It is referred to as an "XY scale" with reference to a cartesian coordinate system, and it is described as comprising a nominally planar substrate (e.g., arranged nominally perpendicular to a scale imaging axis direction, which may be parallel to a z axis in certain implementations). However, more generally, the element name XY scale should be understood to refer to any reference scale comprising a plurality of features or markings that correspond to known two-dimensional coordinates on that reference scale (e.g., accurate and/or accurately calibrated locations in two dimensions), provided that the scale is able to operate as disclosed herein. For example, such scale features may be expressed and/or marked to be in a cartesian coordinate system on that reference scale, or in a polar coordinate system, or any other convenient coordinate system. Furthermore, such features may comprise features distributed evenly or unevenly throughout an operational scale area, and may comprise graduated or ungraduated scale markings, provided that such features correspond to known two-dimensional coordinates on the scale and are able to operate as disclosed herein.

It will be understood that although the robot systems disclosed and illustrated herein are generally shown and described with reference to a certain number of arm portions (e.g., 3 arm portions, 5 arm portions, etc.), such systems are not so limited. In various implementations, provided that it includes arm portions such as those described and/or claimed herein, the robot system may include fewer or more arm portions if desired.

It will be understood that the XY scale or reference scale and a camera that is used to image the scale may undergo rotation relative to one another, depending on the motion and/or position of the robot system. It will be appreciated that methods known in the art (e.g., as disclosed in the incorporated references) may be used to accurately determine any such relative rotation and/or perform any required coordinate transformations, and/or analyze the relative position of the camera and the scale according to principles disclosed herein, despite such relative rotations. It will be understood that the metrology position coordinates referred to herein take into account any such relative rotation. Furthermore, it will be understood that in some implementations the metrology position coordinates referred to herein may comprise a set of coordinates that include a precise determination and/or indication of any such relative rotation, if desired.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An end tool metrology position coordinates determination system for use in conjunction with a robot, the robot comprising:
   a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and
   a motion control system configured to control an end tool position with a level of accuracy defined as a robot accuracy, based at least in part on sensing and controlling a position of the movable arm configuration using at least one position sensor included in the robot,
   the end tool metrology position coordinates determination system comprising:
   an end tool configured to mount to the end tool mounting configuration proximate to the distal end of the movable arm configuration;
   a first imaging configuration comprising a first camera, the first imaging configuration having an optical axis;
   an XY scale comprising a nominally planar substrate and a plurality of respective imageable features distributed on the planar substrate, wherein the respective imageable features are located at respective known XY scale coordinates on the XY scale;
   an image triggering portion configured to input at least one input signal that is related to the end tool position and determine a timing of a first imaging trigger signal based on the at least one input signal and output the first imaging trigger signal to the first imaging configuration, wherein the first imaging configuration is configured to acquire a digital image of the XY scale at an image acquisition time in response to receiving the first imaging trigger signal, and
   a metrology position coordinate processing portion configured to input the acquired image and identify at least one respective imageable feature included in the acquired image of the XY scale, and the related respective known XY scale coordinate location,
   wherein:
   the end tool metrology position coordinates determination system is configured with a movable one of the XY scale or the first imaging configuration coupled to the end tool and the other configured to be coupled to a stationary element proximate to the robot and stationary, with the stationary one of the XY scale or the first imaging configuration defining a first reference position;
   in an operational configuration of the end tool metrology position coordinates determination system, a scale plane is defined to nominally coincide with the planar substrate of the XY scale, and a direction normal to the scale plane is defined as a scale imaging axis direction, and at least one of the XY scale or the first imaging configuration is arranged with the optical axis of the first imaging configuration parallel to a direction of the scale imaging axis direction and with the scale plane located within a range of focus of the first imaging configuration along the scale imaging axis direction;
   the end tool metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine a relative position between the movable one of the XY scale or the first imaging configuration and the first reference position with an accuracy level that is better than the robot accuracy, based on determining an image position of the identified at least one respective imageable feature in the acquired image; and
   the determined relative position is indicative of the metrology position coordinates of the end tool position at the image acquisition time, with an accuracy level that is better than the robot accuracy, at least for a vector component of the x and y metrology position coordinates that is at least one of transverse or perpendicular to the scale imaging axis direction.

2. The end tool metrology position coordinates determination system of claim 1, wherein:
   the robot is configured to move the end tool and the movable one of the XY scale or the first imaging configuration in a plane parallel to the scale plane, while the end tool metrology position coordinates determination system is in the operational configuration.

3. The end tool metrology position coordinates determination system of claim 2, wherein:
   the robot comprises at least one respective rotary joint that provides at least one respective rotational degree of freedom for the end tool; and
   the robot is configured to translate and rotate the movable one of the XY scale or the first imaging configuration relative to the stationary one of the XY scale or the first imaging configuration, including rotating the end tool corresponding to the at least one respective rotational degree of freedom, to at least nominally provide the operational configuration.

4. The end tool metrology position coordinates determination system of claim 1, further comprising a bracket that couples the movable one of the XY scale or the first imaging configuration to the end tool.

5. The end tool metrology position coordinates determination system of claim 1, wherein the XY scale is coupled to the end tool and the first imaging configuration is coupled to the stationary element.

6. The end tool metrology position coordinates determination system of claim 5, wherein the end tool comprises a stylus with a contact point for contacting a surface of a workpiece, the XY scale is located primarily on one side of the end tool or the stylus, and the end tool is configured to be rotated so that the contact point may be moved into contact with the workpiece without the XY scale interfering.

7. The end tool metrology position coordinates determination system of claim 5, wherein the end tool comprises a stylus with a contact point for contacting a surface of a workpiece, and the XY scale at least partially surrounds at least one of the end tool or the stylus in the scale plane.

8. The end tool metrology position coordinates determination system of claim 5, wherein the stationary element comprises a frame arranged above at least a portion of the end tool working volume, and the first imaging configuration is fixed to the frame above a portion of the end tool working volume.

9. The end tool metrology position coordinates determination system of claim 1, wherein when the end tool is a touch probe that is used for measuring a workpiece and that outputs a touch signal when it touches the workpiece, and the image triggering portion is configured to input the touch signal or a signal derived therefrom as its at least one input signal.

10. The end tool metrology position coordinates determination system of claim 9, wherein a central axis of the touch probe is at least nominally parallel to the scale imaging axis direction.

11. The end tool metrology position coordinates determination system of claim 1, wherein when the end tool is a scanning probe that is used for measuring a workpiece and that provides respective workpiece measurement sample data corresponding to a respective sample timing signal, the image triggering portion is configured to input that respective sample timing signal or a signal derived therefrom as its at least one input signal.

12. The end tool metrology position coordinates determination system of claim 1, wherein when the end tool is a camera that is used to provide a respective workpiece measurement image corresponding to a respective workpiece image acquisition signal, the image triggering portion is configured to input that workpiece image acquisition signal or a signal derived therefrom as its at least one input signal.

13. The end tool metrology position coordinates determination system of claim 1, wherein the end tool metrology position coordinates determination system is configured to determine the metrology position coordinates of the end tool position at the image acquisition time, based on the determined relative position and a known coordinate position offset between the end tool position and the movable one of the XY scale or the first imaging configuration.

14. The end tool metrology position coordinates determination system of claim 1, wherein:
the respective imageable features of the XY scale comprise a set of imageable features having unique identifiable patterns, wherein that set of imageable features are distributed on the planar substrate such that they are spaced apart by less than a distance corresponding to a distance across the field of view of the first imaging configuration; and
the metrology position coordinate processing portion is configured to identify at least one respective imageable feature included in the acquired image of the XY scale based on its unique identifiable pattern.

15. The end tool metrology position coordinates determination system of claim 1, wherein the metrology position coordinate processing portion is configured to identify at least one respective imageable feature included in the acquired image of the XY scale based its image position in the acquired image and based on robot position data derived from the motion control system corresponding to the image acquisition time.

16. The end tool metrology position coordinates determination system of claim 15, wherein the respective imageable features of the XY scale comprise a set of similar imageable features that are distributed on the planar substrate such that they are spaced apart from one another by a distance that is more than a maximum position error that is allowed within the robot accuracy.

17. A robot system, comprising:
a robot, comprising:
a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and
a motion control system configured to control an end tool position with a level of accuracy defined as a robot accuracy, based at least in part on sensing and controlling the position of the movable arm configuration using at least one position sensor included in the robot; and
an end tool metrology position coordinates determination system, comprising:
an end tool configured to mount to the end tool mounting configuration proximate to the distal end of the movable arm configuration;
a first imaging configuration comprising a first camera, the first imaging configuration having an optical axis;
an XY scale comprising a nominally planar substrate and a plurality of respective imageable features distributed on the planar substrate, wherein the respective imageable features are located at respective known XY scale coordinates on the XY scale;
an image triggering portion configured to input at least one input signal that is related to the end tool position and determine the timing of a first imaging trigger signal based on the at least one input signal and output the first imaging trigger signal to the first imaging configuration, wherein the first imaging configuration is configured to acquire a digital image of the XY scale at an image acquisition time in response to receiving the first imaging trigger signal, and
a metrology position coordinate processing portion configured to input the acquired image and identify at least one respective imageable feature included in the acquired image of the XY scale, and the related respective known XY scale coordinate location,
wherein:
the end tool metrology position coordinates determination system is configured with a movable one of the XY scale or the first imaging configuration coupled to the end tool and the other is coupled to a stationary element, with the stationary one of the XY scale or the first imaging configuration defining a first reference position;
in an operational configuration of the end tool metrology position coordinates determination system, a scale plane is defined to nominally coincide with the planar substrate of the XY scale, and a direction normal to the scale plane is defined as a scale imaging axis direction, and at least one of the XY scale or the first imaging configuration is arranged with the optical axis of the first imaging configuration parallel to the direction of the scale imaging axis direction and with the scale plane located within the range of focus of the first imaging configuration along the scale imaging axis direction;

the end tool metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine a relative position between the movable one of the XY scale or the first imaging configuration and the first reference position with an accuracy level that is better than the robot accuracy, based on determining an image position of the identified at least one respective imageable feature in the acquired image; and the determined relative position is indicative of the metrology position coordinates of the end tool position at the image acquisition time, with an accuracy level that is better than the robot accuracy, at least for a vector component of the x and y metrology position coordinates that is at least one of transverse or perpendicular to the scale imaging axis direction.

18. The robot system of claim 17, wherein the robot is a SCARA type robot and the movable arm configuration comprises a terminal arm portion and the distal end of the terminal arm portion corresponds to the distal end of the movable arm configuration, and the end tool mounting configuration is located proximate to the distal end of the terminal arm portion.

19. The robot system of claim 18, wherein the movable arm configuration further comprises:

a first arm portion mounted to a first rotary joint at a proximal end of the first arm portion, the first rotary joint having a rotary axis nominally aligned along a z axis direction such that the first arm portion moves about the first rotary joint nominally in an x-y plane that is perpendicular to the z axis, wherein the first arm portion has a second rotary joint located at a distal end of the first arm portion, the second rotary joint having its rotary axis nominally aligned along the z axis direction;

a second arm portion mounted to the second rotary joint at a proximal end of the second arm portion, such that the second arm portion moves about the second rotary joint nominally in an x-y plane that is perpendicular to the z axis; and wherein:

the terminal arm portion is a third portion that is coupled proximate to the distal end of the second arm portion and is configured to provide at least one of motion nominally along the z axis direction or rotation of the end tool nominally around the z axis direction; and the scale plane is configured to be nominally perpendicular to the z axis direction and the scale imaging axis direction nominally corresponds to the z axis direction.

20. The robot system of claim 19, wherein the XY scale is coupled to the end tool and the first imaging configuration is coupled to the stationary element.

21. A method for operating an end tool metrology position coordinates determination system that is utilized with a robot, the robot comprising:

a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and a motion control system configured to control an end tool position with a level of accuracy defined as a robot accuracy, based at least in part on sensing and controlling the position of the movable arm configuration using at least one position sensor included in the robot, the end tool metrology position coordinates determination system comprising:

an end tool configured to mount to the end tool mounting configuration proximate to the distal end of the movable arm configuration;

a first imaging configuration comprising a first camera, the first imaging configuration having an optical axis;

an XY scale comprising a nominally planar substrate and a plurality of respective imageable features distributed on the planar substrate, wherein the respective imageable features are located at respective known XY scale coordinates on the XY scale;

an image triggering portion; and a metrology position coordinate processing portion;

wherein:

the end tool metrology position coordinates determination system is configured with a movable one of the XY scale or the first imaging configuration coupled to the end tool and the other configured to be coupled to a stationary element proximate to the robot, with the stationary one of the XY scale or the first imaging configuration defining a first reference position;

in an operational configuration of the end tool metrology position coordinates determination system, a scale plane is defined to nominally coincide with the planar substrate of the XY scale, and a direction normal to the scale plane is defined as a scale imaging axis direction, and at least one of the XY scale or the first imaging configuration is arranged with the optical axis of the first imaging configuration parallel to the direction of the scale imaging axis direction and with the scale plane located within the range of focus of the first imaging configuration along the scale imaging axis direction; and the end tool metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine a relative position between the movable one of the XY scale or the first imaging configuration and the first reference position with an accuracy level that is better than the robot accuracy, based on determining an image position of the identified at least one respective imageable feature in the acquired image;

the method comprising:

receiving at the image triggering portion at least one input signal that is related to the end tool position and determining the timing of a first imaging trigger signal based on the at least one input signal and outputting the first imaging trigger signal to the first imaging configuration, wherein the first imaging configuration acquires a digital image of the XY scale at an image acquisition time in response to receiving the first imaging trigger signal;

receiving at the metrology position coordinate processing portion the acquired image and identifying at least one respective imageable feature included in the acquired image of the XY scale, and the related respective known XY scale coordinate location; and determining a relative position between the movable one of the XY scale or the first imaging configuration and the first reference position with an accuracy level that is better than the robot accuracy, based on determining an image position of the identified at least one respective imageable feature in the acquired image, wherein the determined relative position is indicative of the metrology position coordinates of the end tool position at the image acquisition time, with an accuracy level that is better than the robot accuracy, at least for a vector component of the x and y metrology position coordinates that is at least one of transverse or perpendicular to the scale imaging axis direction.

22. The method of claim 21, further comprising utilizing the determined relative position for at least one of measuring a workpiece or determining a position of the movable arm configuration.

* * * * *